United States Patent [19]
Shimura et al.

[11] Patent Number: 6,101,362
[45] Date of Patent: Aug. 8, 2000

[54] TUBULAR-FILM AND IMAGE FORMING APPARATUS USING TUBULAR FILM

[75] Inventors: Shoichi Shimura; Kazutaka Takeuchi, both of Yokohama, Japan

[73] Assignee: Canon Kabushiki Kaisha, Tokyo, Japan

[21] Appl. No.: 09/255,329

[22] Filed: Feb. 23, 1999

Related U.S. Application Data

[62] Division of application No. 08/821,735, Mar. 20, 1997, Pat. No. 5,968,300.

[30] Foreign Application Priority Data

Mar. 22, 1996 [JP] Japan .................................. 8-066309

[51] Int. Cl.⁷ .................................................. G03G 15/20
[52] U.S. Cl. ............................................ 399/329; 219/216
[58] Field of Search ................................ 399/329; 432/59; 219/216

[56] References Cited

U.S. PATENT DOCUMENTS

| | | | |
|---|---|---|---|
| 3,063,888 | 11/1962 | Howard et al. ..................... | 156/188 X |
| 4,267,139 | 5/1981 | Scheibe et al. ..................... | 156/137 X |
| 5,017,969 | 5/1991 | Mitomi et al. ..................... | 355/271 |
| 5,266,134 | 11/1993 | Shimura ............................. | 156/84 |
| 5,752,149 | 5/1998 | Yuza et al. ........................ | 399/329 |

FOREIGN PATENT DOCUMENTS

| | | |
|---|---|---|
| 52-117377 | 10/1977 | Japan . |
| 63-34120 | 2/1988 | Japan . |
| 63-374121 | 2/1988 | Japan . |
| 63-313182 | 12/1988 | Japan . |
| 3-25477 | 2/1991 | Japan . |
| 3-266870 | 11/1991 | Japan . |
| 4-9989 | 1/1992 | Japan . |
| 4-292680 | 10/1992 | Japan . |
| 5-323809 | 12/1993 | Japan . |

*Primary Examiner*—Joan Pendegrass
*Attorney, Agent, or Firm*—Fitzpatrick, Cella, Harper & Scinto

[57] ABSTRACT

A tubular film for fixing a unit of an image forming apparatus. Includes a rib portion as an engage portion at its one end. For forming the rib portion, a groove is provided at an end of a cylindrical member, as an inner mold, and/or a tubular mold member as an outer mold, and a film to be the rib is rolled along the groove.

6 Claims, 31 Drawing Sheets

FIG. 3

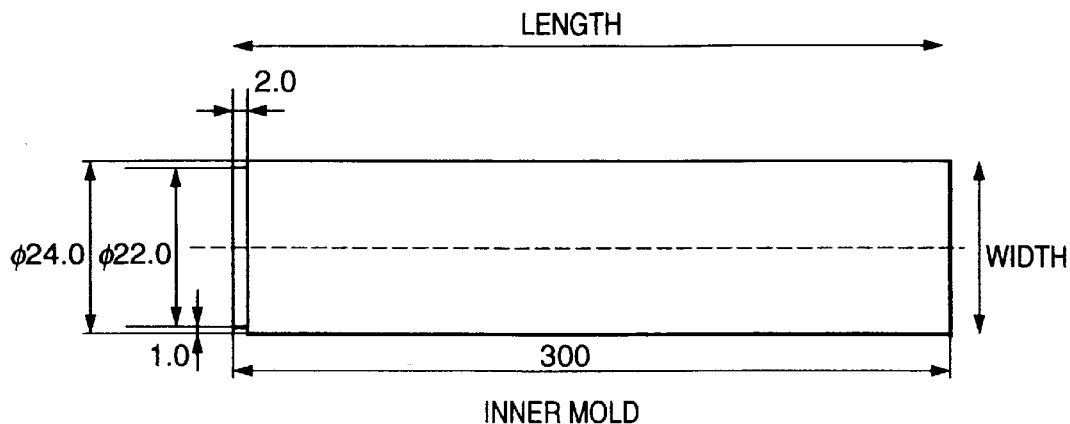

INNER MOLD

FIG. 4

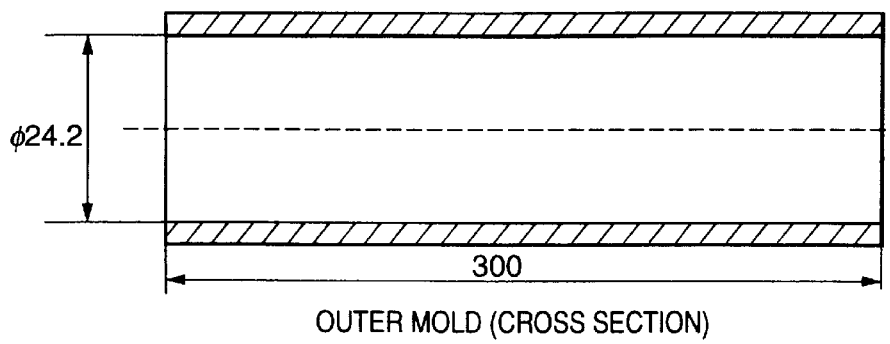

OUTER MOLD (CROSS SECTION)

| < MEASUREMENTS OF FILM > | WIDTH (VERTICAL) | LENGTH (HORIZONTAL) | THICKNESS | NUMBER OF ROUNDS |
|---|---|---|---|---|
| FILM 4 BASE PORTION : | 79mm | 270mm | 50μm | 1 |
| FILM 5 RIB PORTION : | 1520mm | 2mm | 50μm | 20 |

< MOLD SIZE UPON MELT-JOINING (370°C) >

| | MATERIAL | THERMAL-EXPANSION COEFFICIENT | INNER MOLD | | OUTER MOLD |
|---|---|---|---|---|---|
| | | | φ22.0 | φ24.0 | φ24.2 |
| INNER MOLD | ALUMINUM | $2.4 \times 10^{-5}$ | φ22.182 | φ24.199 | — |
| OUTER MOLD | STAINLESS STEEL | $1.5 \times 10^{-5}$ | — | — | φ24.325 |

\* DIFFERENCE BETWEEN OUTER AND INNER MOLD WHEN HEATED

φ24.0 PORTION : 24.325 − 24.199 = 0.126 (0.15)
φ22.0 PORTION : 24.325 − 22.182 = 2.143 (2.2)

(MELT-JOINED STATE OF FILM WHEN HEATED)

MELT-JOINED PORTION
(INCLUDING ALL BORDER LINES)

A-A' CROSS-SECTION (FILM 5 TO BE RIB ROLLED AROUND CYLINDRICAL MEMBER)

B-B' CROSS-SECTION

MEASUREMENTS OF INNER MOLD OF SECOND EMBODIMENT

INNER MOLD

OUTER MOLD

C-C' CROSS-SECTION

D-D' CROSS-SECTION

FOURTH EMBODIMENT

MEASUREMENT OF FILM OF FOURTH EMBODIMENT

INNER MOLD

OUTER MOLD

E-E' CROSS-SECTION

F-F' CROSS-SECTION

FIG. 35

| No. | CYLINDRICAL MEMBER | THERMAL-EXPANSION COEFFICIENT (/°C) | TUBULAR-MOLD MEMBER | THERMAL-EXPANSION COEFFICIENT (/°C) |
|---|---|---|---|---|
| 1 | Aℓ | $2.4 \times 10^{-5}$ | STAINLESS STEEL | $1.5 \times 10^{-5}$ |
| 2 | Aℓ | $2.4 \times 10^{-5}$ | GLASS | $5.5 \times 10^{-7}$ (QUARTZ) $9.9 \times 10^{-6}$ (PLATE GLASS) |
| 3 | PTFE | $10.0 \times 10^{-6}$ | STAINLESS STEEL | $1.5 \times 10^{-5}$ |
| 4 | PTFE | $10.0 \times 10^{-6}$ | Aℓ | $2.4 \times 10^{-5}$ |
| 5 | PTFE | $10.0 \times 10^{-5}$ | GLASS | $5.5 \times 10^{-7} \sim 9.9 \times 10^{-6}$ |

TUBULAR-FILM AND IMAGE FORMING APPARATUS USING TUBULAR FILM

This application is a divisional of application Ser. No. 08/821,735, filed Mar. 20, 1997, now U.S. Pat. No. 5,968,300.

BACKGROUND OF THE INVENTION

This invention relates to a tubular film including circular, tubular, cylindrical, ring or belt type films used as a conveyance belt for conveying fine parts at predetermined positions assuring high-precision positional information, or used in an airtight container for containing a product or the like, and a tubular-film manufacturing method. The present invention can be mainly used as a functional part of an image forming apparatus.

Especially, the technique of the present invention is preferable to manufacture a fixing film of an image fixing unit used in an image forming apparatus such as a copier, a printer and a facsimile apparatus.

Known conventional tubular-film manufacturing methods are:

(1) Press heat-melt molding represented by an inflation method;
(2) Casting and centrifugal molding methods of applying a predetermined amount of liquid-state resin or its precursor to inner circumferential surface or outer circumferential surface of a tubular mold, and through desolvent and chemical reaction, removing the formed film from the mold;
(3) As proposed by Japanese Patent Application Laid-Open Nos. 63-34120 and 63-34121, a lining method of: rolling a film sheet around a core member, melt-joining both ends of the film, and lining the inner surface of a hollow tubular member with the roll of the film sheet; and
(4) A method for manufacturing a polytetrafluoroethylene tubular member proposed by Japanese Patent Application Laid-Open No. 52-117377.

Note that as prior applications, Japanese Patent Application Laid-Open Nos. 3-25477, 3-266870, 4-9989 and 4-292680 by the present applicant are known.

In the heat-melt molding (1), when the tubular film formed by the inflation method is removed from the mold the film may be deformed. In a case where this tubular film is used as a fixing film of a fixing unit of an image-forming apparatus as shown in FIG. 25, the deformed part causes degradation of image quality.

Regarding the casting method and centrifugal method (2), to obtain a uniform film thickness, liquid-density management, dry and reaction atmosphere adjustment, and solvent processing at a drying step increase costs. In addition, for the centrifugal molding, a large-scale device must be used.

The lining (3) of the hollow tubular member can obtain a lining layer of a uniform thickness. However, to obtain a tubular film from the lining layer, separation of the film from the inner circumferential surface of the hollow tubular member may not be successfully done due to tight adherence between the film and the inner circumferential surface of the tubular member.

The main purpose of the conventional methods (1) to (5) is to manufacture a tubular film of a uniform thickness. When the tubular film of a uniform thickness obtained by any of methods (1) to (5) is rotated, meandering of the film occurs. To solve this problem, it is necessary to strictly manage measurement precision of drive roller and the like.

SUMMARY OF THE INVENTION

The present invention has been made in consideration of the above situation, and has its object to provide a tubular film having a film-end portion (rib portion) thicker than the other portion, a tubular-film manufacturing method, a fixing unit using the tubular film, and a conveyance unit using the tubular film, with lower costs. More specifically, the present invention proposes a film-type conveyance member which is appropriate to heat an information-recording medium such as a paper sheet on which toner for image formation is placed and conveys the heated recording medium under a pressed condition. Further, the present invention proposes a tubular fixing film of a fixing unit of an image forming apparatus. The fixing film has an engage portion to be stably engaged with a drive roller which rotate-drives the tubular fixing film while transmitting heat to the film.

According to the present invention, the term "tubular film" includes films in the shape of a loop, a tube, a circle, a ring, a cylinder, a hollow member and the like, formed by combining both ends of a plane or sheet-type film.

Generally, a conveyance belt or a belt conveyer is a rubber or steel belt having a thickness of about 1 mm. The term "film" in the present application indicates a member having a thickness of 1 mm or less as within an applicable range of the present invention. Furthermore, the present invention assures highly precise measurements of the rib portion as an engage portion of the tubular film, thus realizes stable engagement between the film and the roller.

According to the present invention, the foregoing object is attained by providing a tubular film manufactured by rolling a first thermoplastic film sheet into a tubular shape, such that a part of a roll-head and a part of a roll-end overlap with each other, rolling a second thermoplastic film sheet, having a width narrower than that of the first thermoplastic film sheet, on the inner circumferential surface or the outer circumferential surface of the tubular-shaped first film sheet, on at least one end of the tubular-shaped first film sheet, at least one round, and heat-melt-joining the first and second film sheets, so that the tubular film has a rib portion thicker than the other portion.

Further, the present invention proposes an image forming apparatus which obtains high image quality, by using a tubular film as a fixing film and a conveyance belt for fixing and conveying a toner image-holding member. The tubular film is manufactured by rolling a thermoplastic film sheet into a tubular shape and heat-joining overlapped ends of the film sheet, and heat-joining another thermoplastic film sheet, having a width narrower than that of the tubular-shaped film, at least at one end portion of the tubular-shaped film, so that this portion is thicker than the other portion, as an engage portion to be held upon rotation of the tubular film.

Further, the present invention proposes a tubular film for a fixing unit of an image forming apparatus. The tubular film, is used for heat-fixing toner on an image holding member. The tubular film is integrally manufactured with an engage portion to be engaged with a heat-transmitting member for transmitting heat to the tubular film.

Further, the present invention proposes a tubular film manufactured by rolling a thermoplastic film sheet having a thickness t around a cylindrical member n rounds, inserting the cylindrical member into a tubular mold member, heating the cylindrical member and the tubular mold member within a melt-joining temperature range of the film, so as to obtain a gap between the cylindrical member and the tubular mold member as $(2n+1) \times t > x' \geq 2nt$; and melt-joining both ends of the film sheet.

Further, the present invention proposes a conveyance belt for image forming apparatus manufactured by rolling a thermoplastic film sheet into a tubular shape, such that a part of a roll-head and a part of a roll-end overlap with each other, rolling another thermoplastic film sheet, as a rib potion, at least at one portion of the inner circumferential surface or the outer circumferential surface of the tubular-shaped film sheet so that the rib portion is thicker than the other portion of the tubular-shaped film sheet, and placing the tubular-shaped film sheet in a heated condition for a predetermined period and heat-melt-joining the overlapped roll-head and roll-end, and the tubular-shaped film sheet and the rib portion.

Other objects and advantages besides those discussed above shall be apparent to those skilled in the art from the description of a preferred embodiment of the invention which follows. In the description, reference is made to accompanying drawings, which form a part thereof, and which illustrate an example of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing the measurements of the cylindrical member 1, according to the first embodiment;

FIG. 4 is a diagram showing the measurements of the tubular member 2, according to the first embodiment;

FIG. 35 is a table showing the combinations of materials of the cylindrical member and the tubular member.

DETAILED DESCRIPTION OF THE PREFERRED EMBODIMENTS

Preferred embodiments of the present invention will now be described in detail in accordance with the accompanying drawings.

[First Embodiment]

Figure 1:
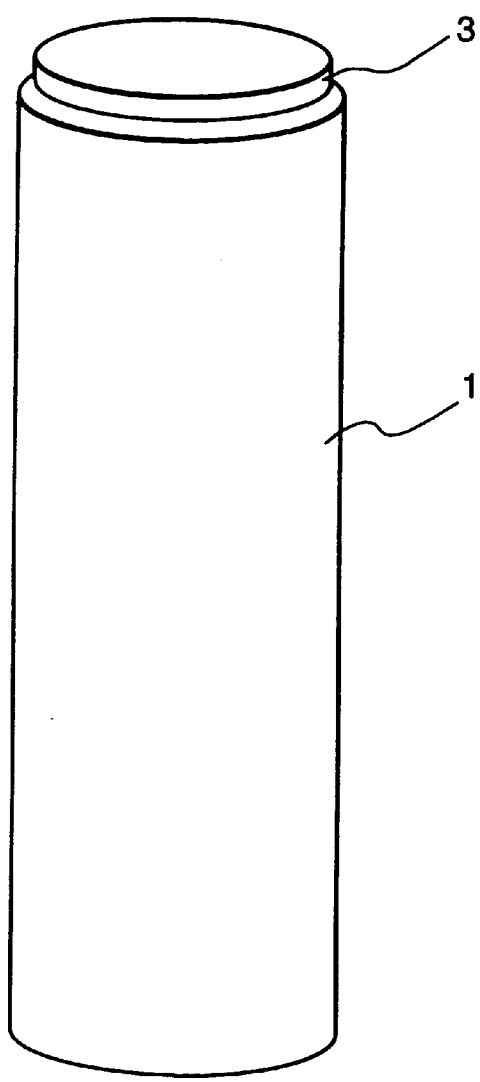
FIG. 1 is a perspective view of a cylindrical member 1 as an inner mold according to a first embodiment of the present invention.
Figure 2:
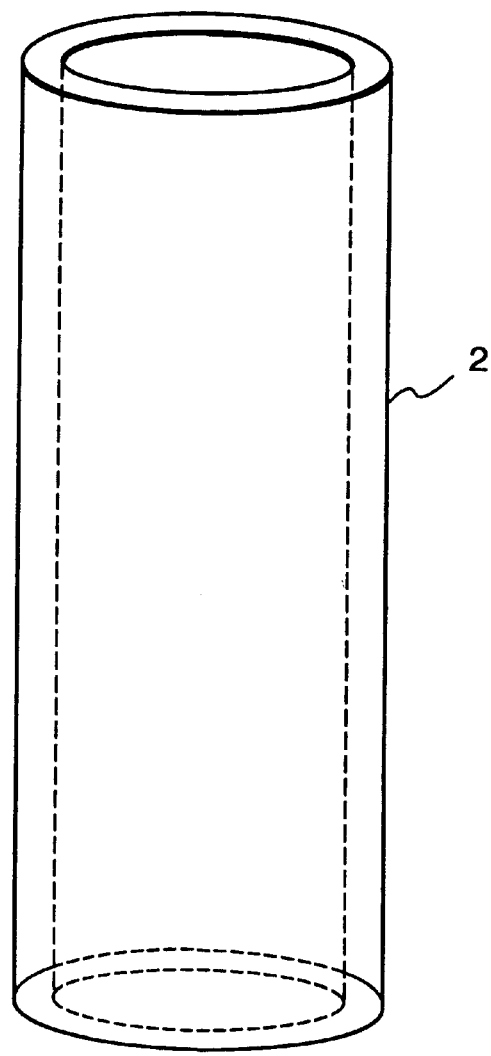
FIG. 2 is a perspective view of a hollow tubular member 2 as an outer mold according to the first embodiment.

FIGS. 1 to 15 show a first embodiment of the present invention. In FIG. 1, reference numeral 1 denotes a cylindrical member around which a film 4 (See FIG. 5) is rolled. In the present embodiment, the cylindrical member is a bar member having a small-diameter portion (or a groove) 3 at one end. In FIG. 2, numeral 2 denotes a hollow tubular mold member which has a diameter large enough to cover the cylindrical member 1. In the present embodiment, the material of the cylindrical member 1 is aluminum, and that of the tubular mold member 2 is stainless steel. The materials are selected such that the thermal-expansion coefficient of the cylindrical member 1 is greater that that of the tubular mold member 2.

Figure 5:
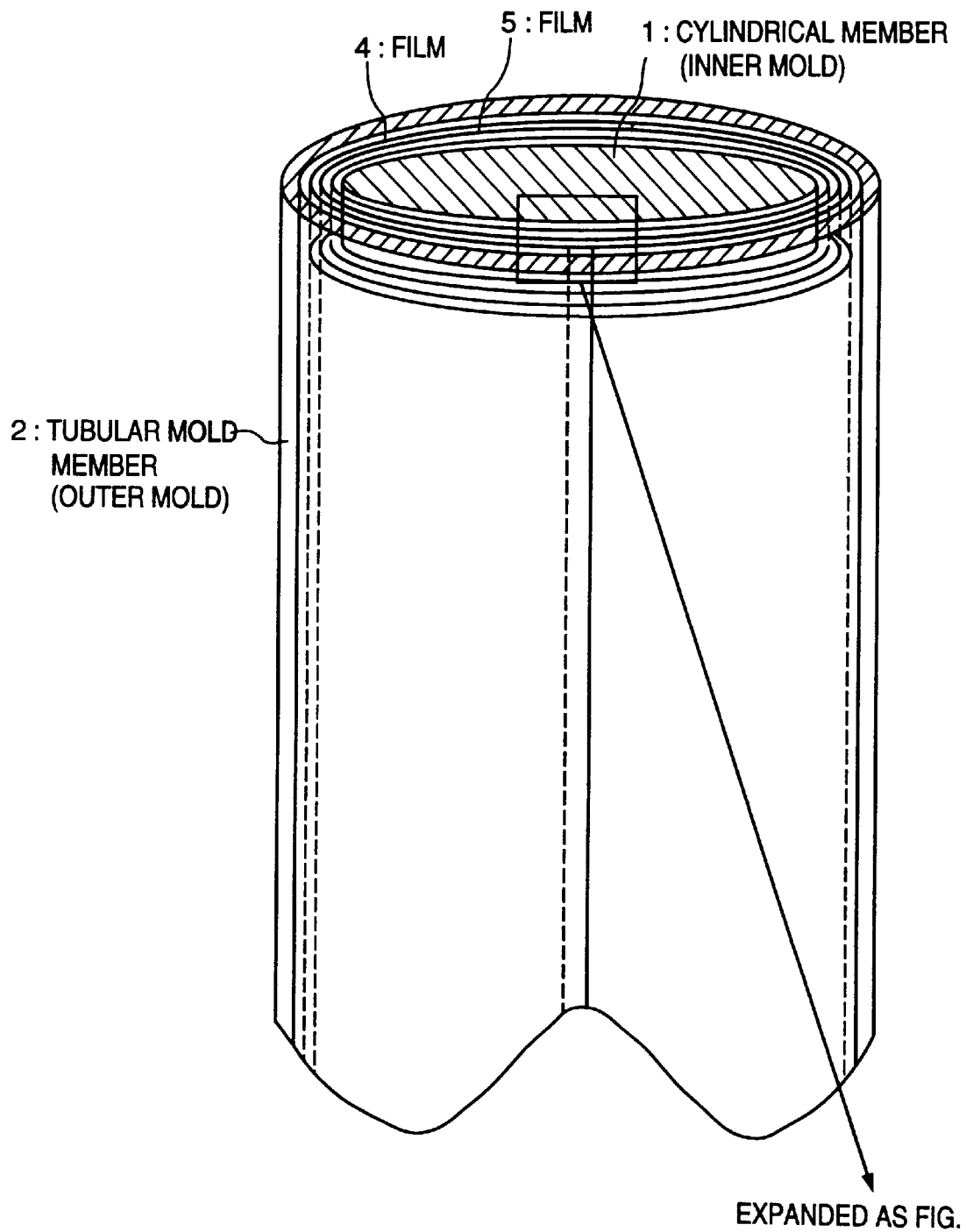
FIG. 5 is a perspective view showing the cylindrical member 1 around which films 4 and 5 are rolled and the tubular member 2 covering the cylindrical member 1, according to the first embodiment.

Next, a method for manufacturing a tubular film will be described. First, the size of a film sheet 4 is determined in accordance with the diameter of the tubular film to be manufactured, and in accordance with the size of the film sheet 4, the measurements of the cylindrical member 1 and the tubular mold member 2 are determined. A film sheet (length: 79, width: 270 mm, thickness: 50 μm) of thermoplastic material (here polyetheretherketone (malleated with two rollers)) is prepared as the film sheet 4, and a film sheet (length: 1520, width: 2 mm, thickness: 50 μm) is prepared as the film sheet 5 (FIG. 5).

The thermal-expansion coefficient of the aluminum cylindrical member 1 is $2.4 \times 10^{-5}$ (/°C.); and that of the stainless-steel tubular mold member 2 is $1.5 \times 10^{-5}$ (/°C.). The measurements of the respective parts of the cylindrical member 1 are as shown in FIG. 3. That is, the diameter is 24.0 mm; the length, 300.0 mm; the width of a small-diameter portion 3, 2 mm; and the depth of the small-diameter portion 3, 1 mm.

The respective measurements of the tubular mold member 2 are as shown in FIG. 4. That is, the inner diameter is 24.2 mm; the outer diameter, 30.0 mm; and the length, 300.0 mm. The measurements of the cylindrical member 1 and the tubular mold member 2 are set such that when these members are heated at a heating process to be described later, the following relation can hold:

$$(2n+1) \times t > x' \geq 2nt \quad (1)$$

temperature: 370° C.

x': difference between the outer diameter of the cylindrical member 1 and the inner diameter of the tubular mold member 2 n: number of rounds of rolling film sheet t: film thickness

The difference x of the diameter of the cylindrical member 1 and the inner diameter of the tubular mold member 2 before heating is set such that:

$$x \geq (2n+1) \times t \quad (2)$$

Figure 6:
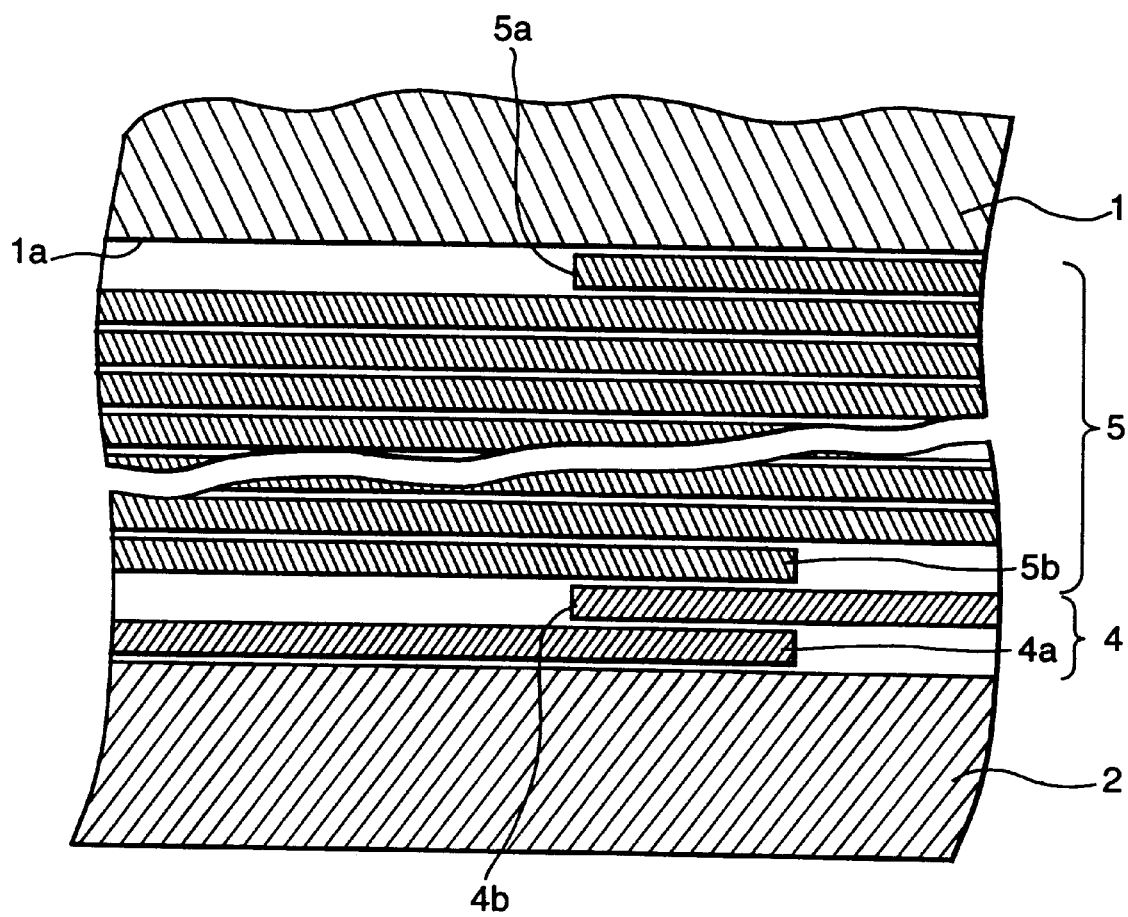
FIG. 6 is an expanded view of a portion P in FIG. 5.
Figure 13:
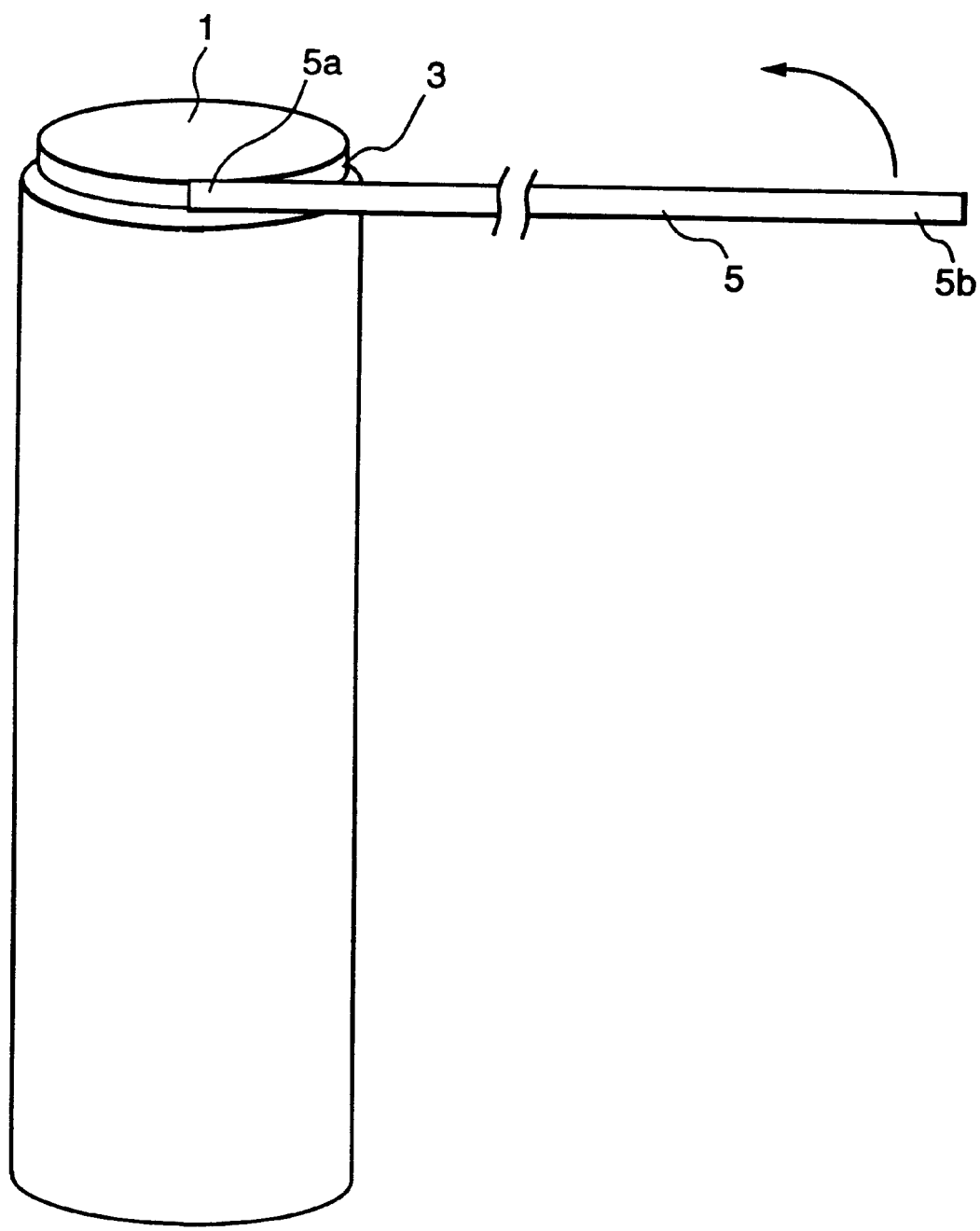
FIG. 13 is an explanatory view showing how a film 5 to be a rib portion is rolled around the cylindrical member 1, according to the first embodiment.
Figure 14:
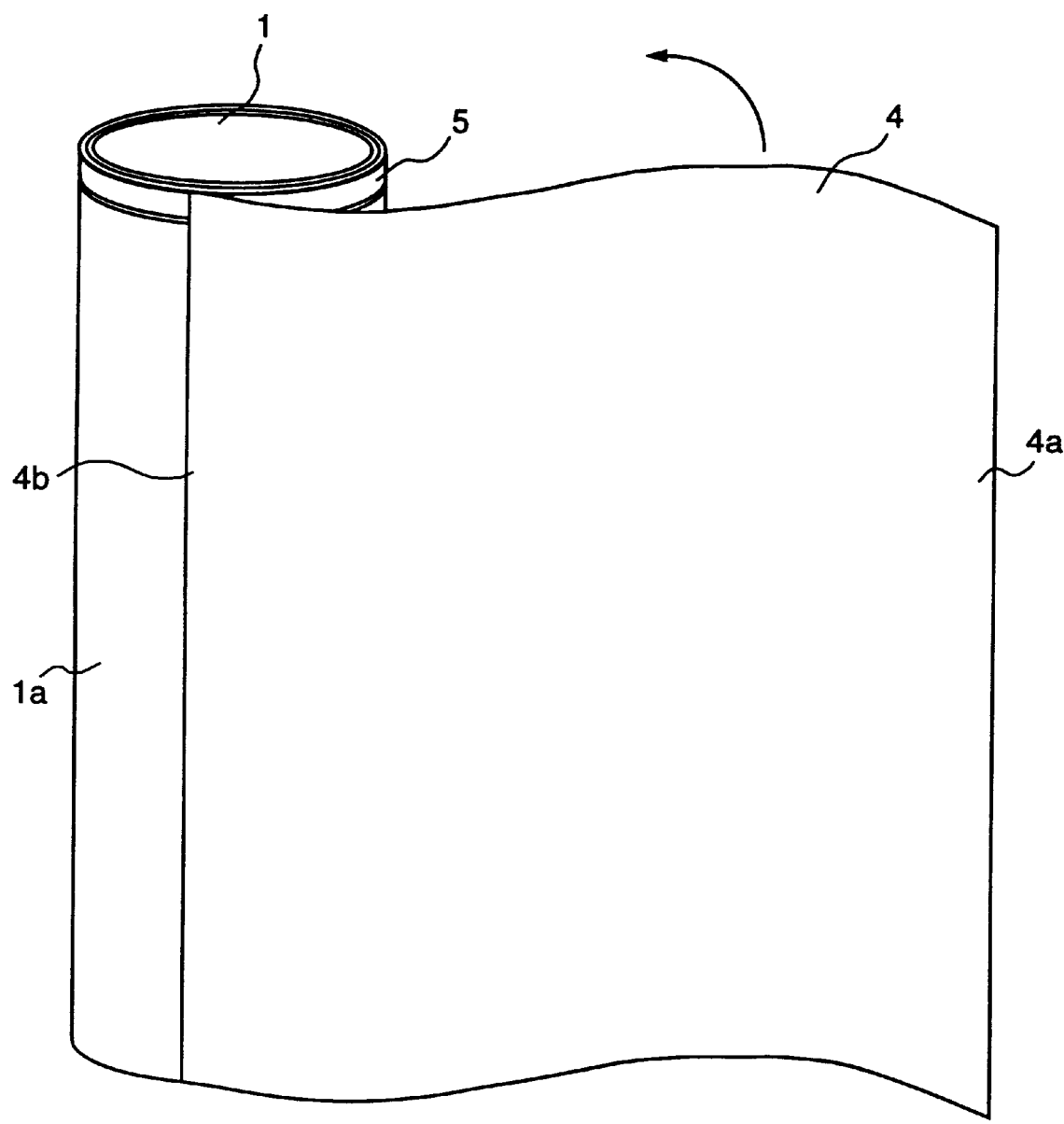
FIG. 14 is an explanatory view showing how a film sheet 4 is rolled around the cylindrical member 1, according to the first embodiment.
Figure 15:
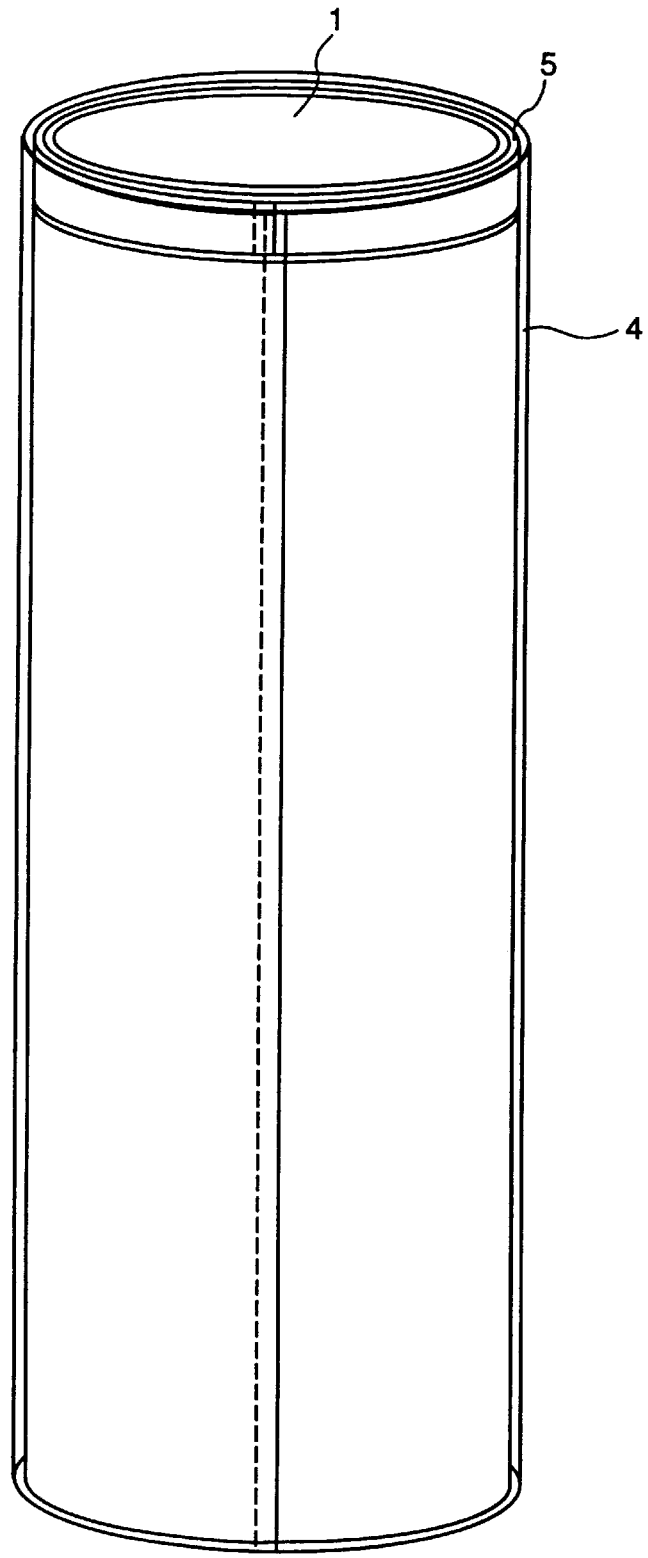
FIG. 15 is a perspective view showing a tubular film where the films 4 and 5 are rolled around the cylindrical member 1.

Next, how to roll the film sheets 4 and 5 and insert the cylindrical member 1 into the tubular mold member 2 will be described. First, as shown in FIG. 13, the film sheet 5 is rolled around the cylindrical member 1 at the small-diameter portion 3, about 20 rounds. The width of the overlapped portion of the film 5 is about 4.0 mm. The film 5 to be a rib portion of the tubular film has a width of 2 mm corresponding to the width (2 mm) of the small-diameter portion 3 of the cylindrical member 1. The film 5 is rolled from a roll-head 5a to a roll-end 5b, over the end of the cylindrical member 1 such that the roll-head 5a and the roll-end 5b overlap with each other, as shown in FIG. 6. Next, as shown in FIG. 14, the film sheet 4 is rolled on an outer circumferential surface 1a of the cylindrical member 1 one round. FIG. 15 shows the film sheet 4 rolled around the cylindrical member 1. At this time, end portions 4a and 4b of the film 4 partially overlap (See FIGS. 5 and 6).

Next, the cylindrical member 1 around which the film sheets 4 and 5 are rolled is inserted into the tubular mold member 2, as shown in FIG. 6. The portion where the film 5 as the rib portion occupies the space formed by the small-diameter portion 3 of the cylindrical member 1 as the inner mold and the tubular mold member 2 as the outer mold.

Figure 7:
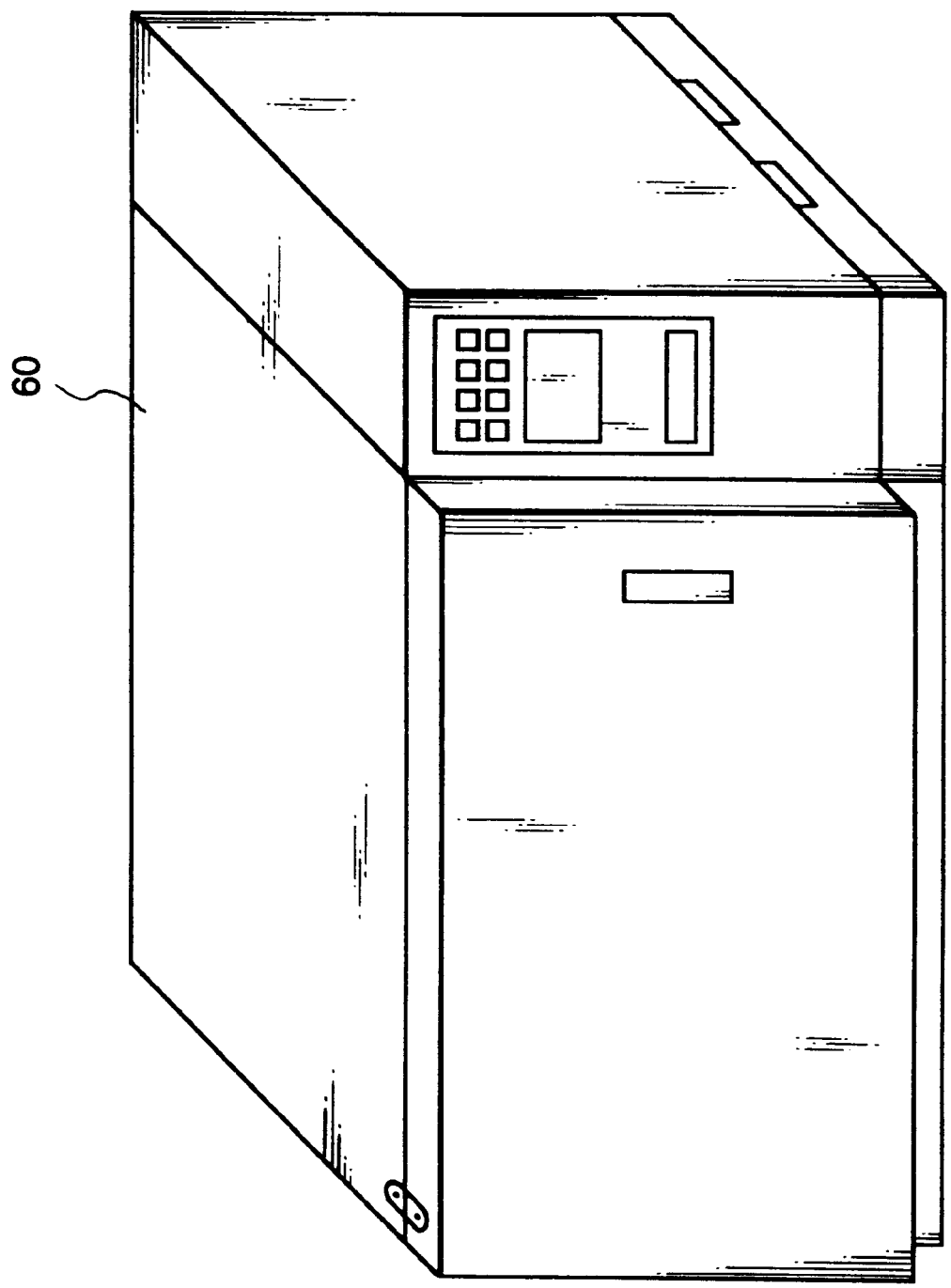
FIG. 7 is an overview of a heating furnace according to the first embodiment.

Then, maintaining the above status, where the film sheets 4 and 5 are rolled around the cylindrical member 1, inserted in the tubular mold member 2, the tubular mold member 2 is placed in a heating furnace 60 as shown in FIG. 7 and heated there.

As the heating conditions in the heating furnace 60, the heating temperature is 370±5° C., and the heating period is 30±1 minute. The heating period is determined in consideration of the melting temperature of the film material and the degraded state of the film. At the heating process in the heating furnace 60, the film sheets 4 and 5 receive melt-joining pressure based on the size change of the cylindrical member 1 and the tubular mold member 2 according to the respective thermal-expansion coefficients, caused by temperature rise. In the heating furnace 60, the film sheet 4 is rolled in a gap between the cylindrical member 1 as the core and the tubular mold member 2, with both ends 4a and 4b overlapped each other. At this time, the film sheet 5 is in contact with the inner surface of the film 4.

The gap between the diameter of the cylindrical member 1 and the inner diameter of the tubular mold member 2 is 200 μm. The cylindrical member 1, the film sheets 4, 5, and the tubular mold member 2 are heated, and the temperatures of the respective members increase. The cylindrical member 1 and the tubular mold member 2 begin to expand in accordance with the respective thermal-expansion coefficients. The film sheets 4 and 5 begin to soften with temperature rise.

Regarding the cylindrical member 1 and the tubular mold member 2 expanding with temperature rise, as the thermal-expansion coefficient of the cylindrical member 1 is greater than that of the tubular mold member 2, the gap between the diameter of the cylindrical member 1 and the inner-diameter of the tubular mold member 2 becomes smaller.

As the gap between the cylindrical member 1 and the tubular mold member 2 becomes smaller, the film sheets 4 and 5 rolled between the cylindrical member 1 and the tubular mold member 2 becomes softer. The overlapped portion of the ends 4a and 4b of the film sheet 4 is expanded by the softened film and the reduction of the gap, in a circumferential direction around the cylindrical member 1, and the overlapped ends 4a and 4b are melt-joined to each other. Note that the gap between the cylindrical member 1 and the tubular mold member 2 finally corresponds to a desired film thickness, and the step-like overlapped portion is smoothed. At the same time, the film sheet 5 softens and is melt-joined to the film sheet 4. Also, the overlapped portions made by rolling the film 5 20 rounds are melt-joined to each other. Thus the rolled film sheets 4 and 5 are integrated into a tubular film.

The change of the measurements of the respective members at a heating temperature of 370° C. are as follows. The diameter of the cylindrical member 1 expands from 24 mm to 24.199 mm; the diameter of the small-diameter portion 3, from 22 mm to 22.182 mm; and the inner diameter of the tubular mold member 2, from 24.2 mm to 24.325 mm.

Accordingly, the difference between the diameter. of the cylindrical member 1 and the inner diameter of the tubular mold member 2 when heated is:

24.325−24.199=0.126 mm

The difference between the inner diameter of the tubular mold member 2 and the diameter of the small-diameter portion 3 when heated is:

24.325−22.182=2.143 mm

As shown in FIG. 6, the overlapped portion of the film 4 rolled around the large-diameter portion (24 mm) of the cylindrical member 1 has a thickness of 50 μm×3, the original film thickness [of the film 4] at that portion before heat-joined is 0.15 mm.

Regarding the small-diameter portion (22 mm) 3 of the cylindrical member 1, as the film 5 has been rolled 20 rounds (50 gm×20) and the roll-head 5a and the roll-end 5b are overlapped with each other, the original film thickness of the film 5 at that portion is 2.2 mm.

Figure 8:
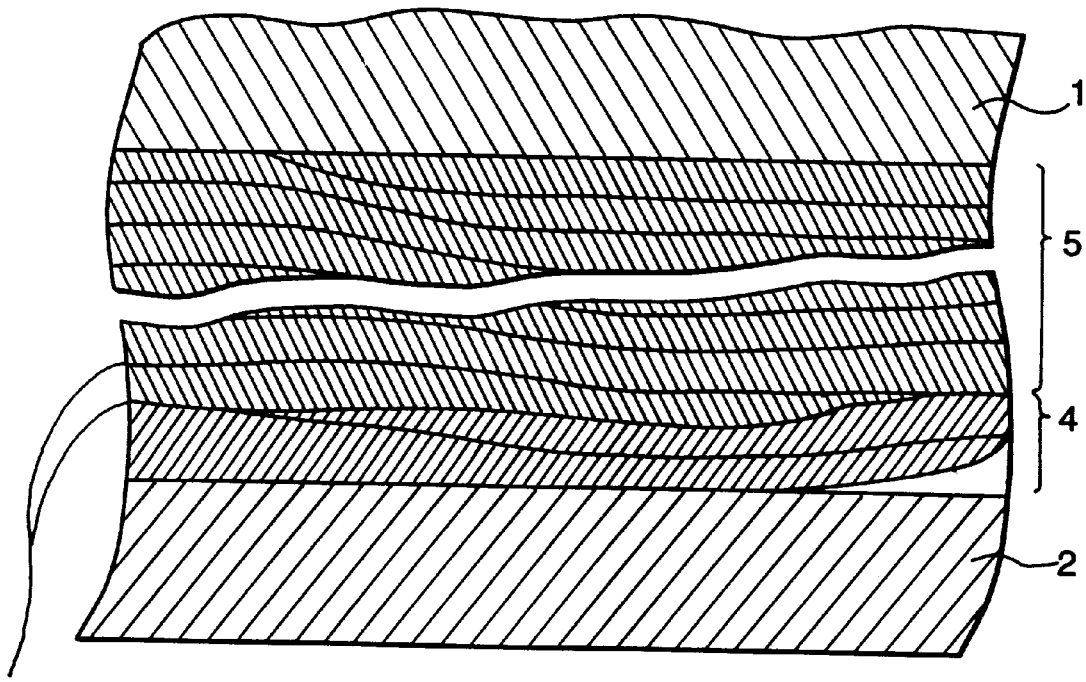
FIG. 8 is an expanded view of the portion P in FIG. 5 in heat-melt-joined state.
Figure 9:
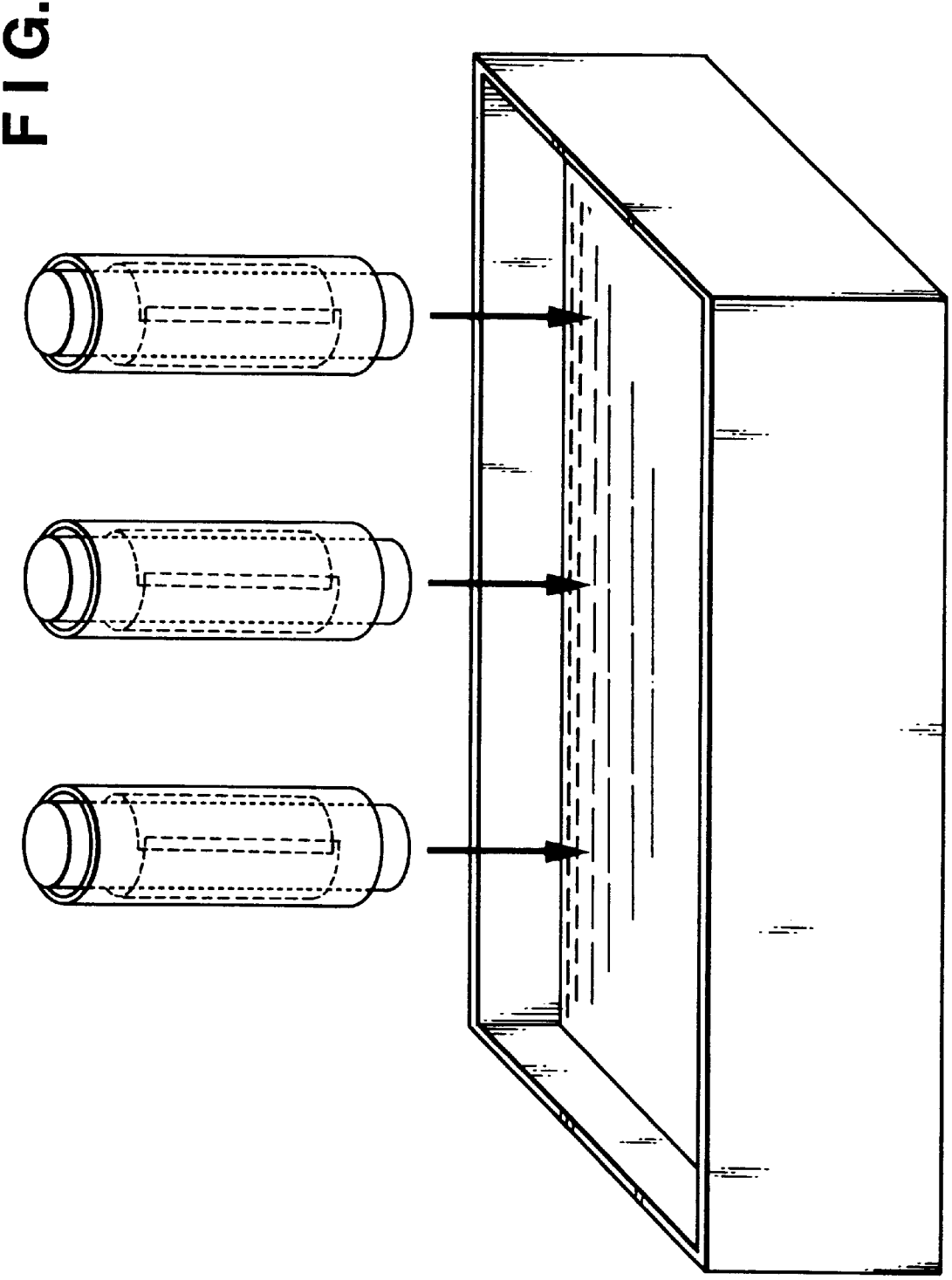
FIG. 9 is an explanatory view showing a cooling step according to the first embodiment.
Figure 10:
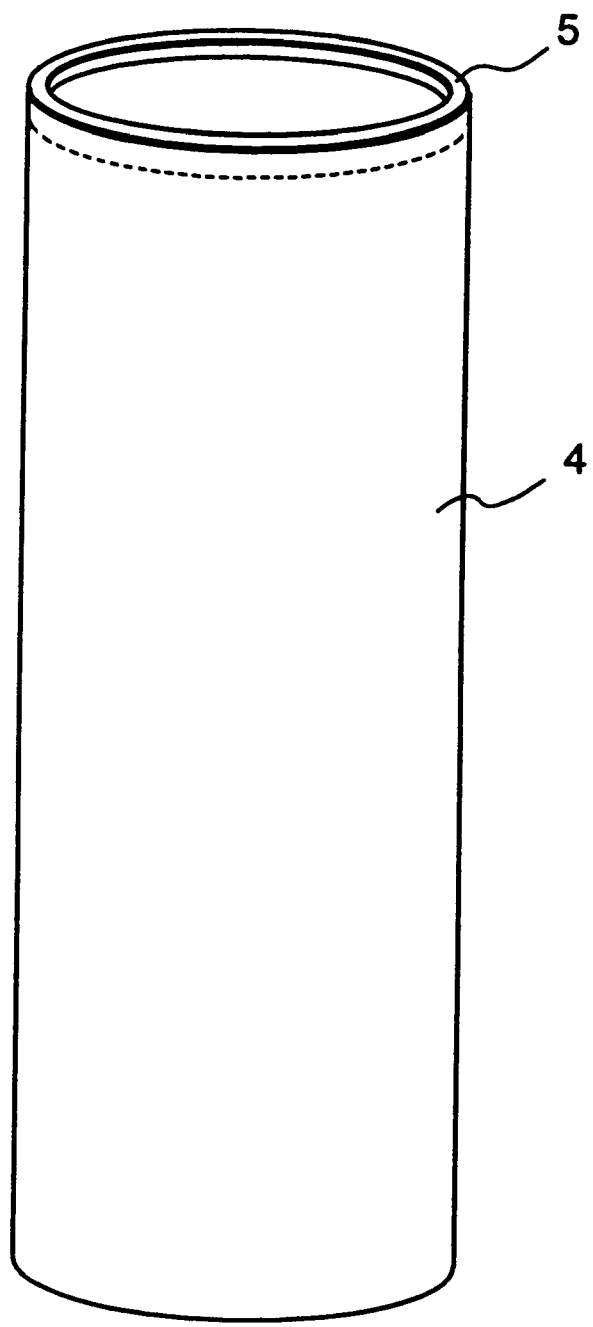
FIG. 10 is a perspective view showing a fixing film manufactured according to the first embodiment.

As described above, the changes of the measurements of the respective members due to thermal expansion by heat causes the film sheets 4 and 5 to soften and melt-join to each other due to the reduction of gap between the inner and outer molds. As a result, as shown in FIG. 8, the both ends 4a and 4b of the film sheet 4 melt-join to each other, which forms the rolled film sheet 4 into a tubular film, and the respective 20 rounds of the film sheet 5 melt and become integrated into one tubular rib portion. Further, the roll-end 5b in contact with the film sheet 4 becomes melt-joined to the film sheet 4, thus the film sheets 4 and 5 are melt-integrated into one tubular film. When the 30 minutes heating period has elapsed, the heating process ends. The tubular film is then subjected to a cooling process. The cooling process is realized by dipping the product (tubular film), i.e., the tubular mold member 2 including the cylindrical member 1 and the tubular film (films 4 and 5), taken out of the heating furnace, into cooling liquid as shown in FIG. 9.

The cooling process may be realized by naturally cooling the cylindrical member 1, the tubular film (films 4 and 5), and the tubular mold member 2, after the heating at the heating process has been stopped, however, to reduce the cooling period, quick cooling may be performed. In the present embodiment, the tubular mold member 2 including the cylindrical member 1 and the tubular film (films 4, 5) are cooled in the cooling liquid (See FIG. 9) in the liquid reservoir at a cooling rate of 300° C./min.

Thereafter, the cylindrical member 1, the tubular mold member 2 and tubular film (films 4 and 5), at about room temperature, are taken out of the heating furnace 60. At this time, the overlapped ends of the rolled film sheet 4 are smoothly joined, and the product has been completed as a tubular film having a 2 mm (width)×1 mm (thickness) rib portion at one end portion (See FIG. 10).

Figure 11:
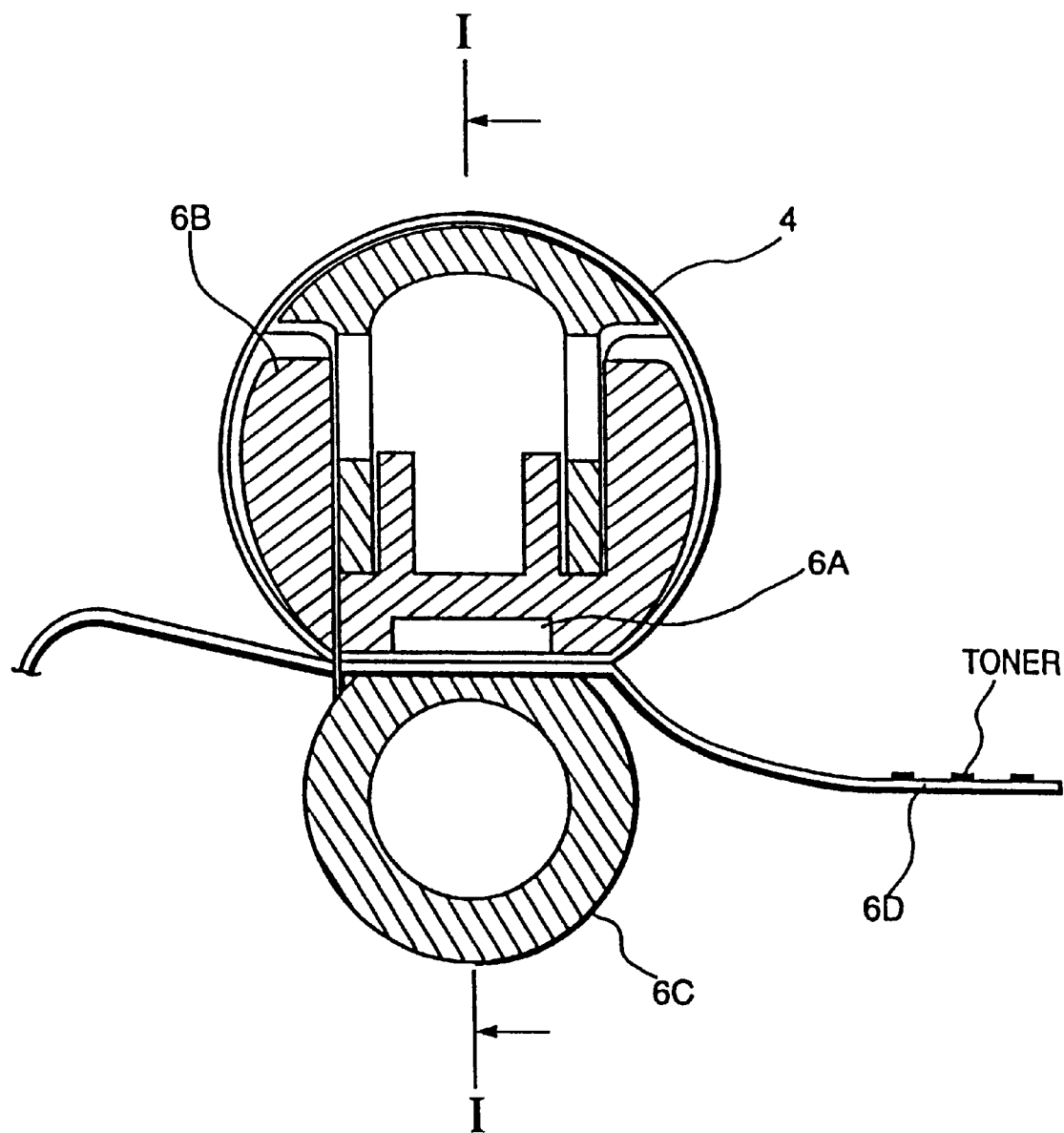
FIG. 11 is a cross-sectional view showing a fixing unit using the fixing film of the first embodiment.
Figure 12:
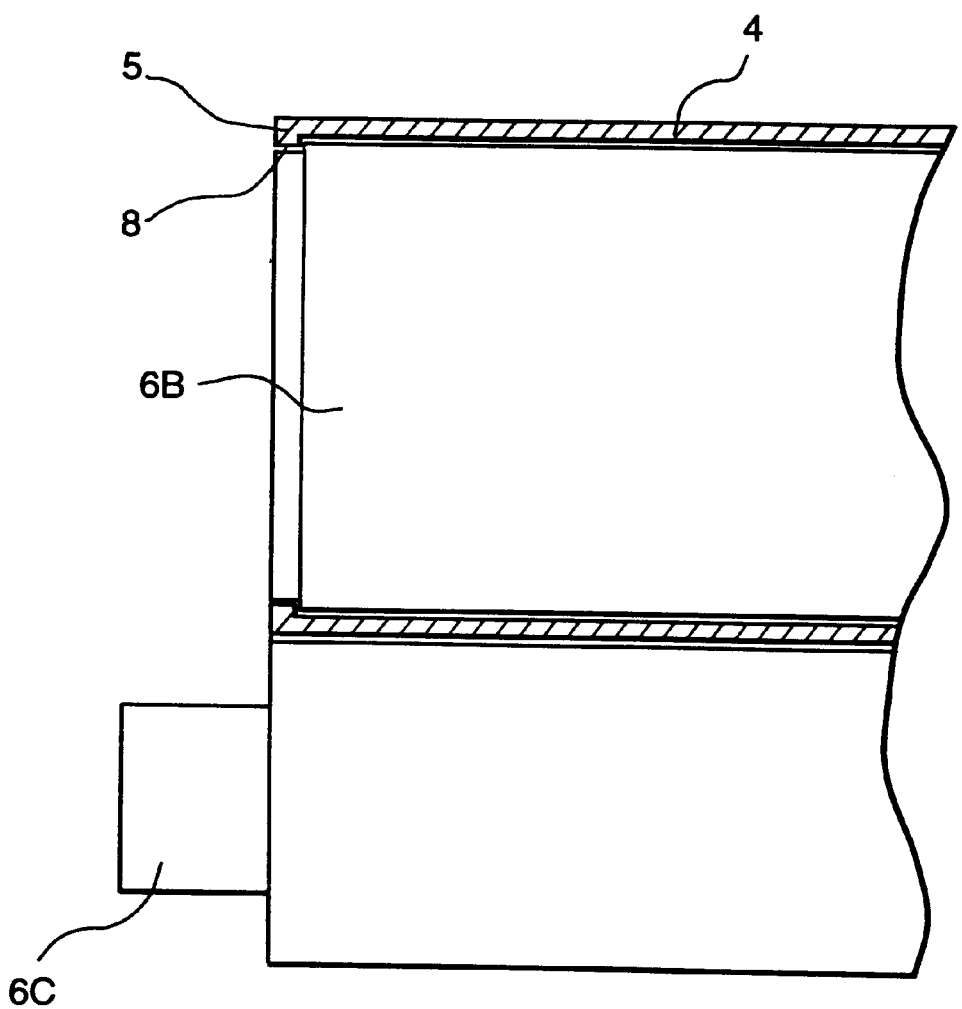
FIG. 12 is a cross-sectional view cut along a line A–A' in FIG. 11.

Next, the use of the tubular film manufactured in the above method will be described. FIG. 11 shows an example where an image forming apparatus (laser-beam printer (LBP)) using the tubular film at its fixing unit. FIG. 12 shows a cross-sectional view cut along a line A–A' in FIG. 11.

In FIG. 11, numeral 4 denotes the tubular film (fixing film) of the present invention; 6A, a heater for the fixing film 4; and 6B, a heater holder [holding the heater 6A]. The heater holder 6B has a 2.5 mm (width)×1.5 mm (depth) groove 8 on the circumferential surface, as a portion to be engaged with a rib portion [4A]5 of the fixing film 4. The film 4 is arranged such that the rib portion 5 of the film 4 is inserted into the groove 8. Numeral 6C denotes a pressing roller which is driven by a drive means (not shown) such as a motor. In the fixing unit, a toner holding member 6D such as a print sheet on which toner forming an image is held is conveyed between the fixing film 4 and the pressing roller 6C. At this time, heat of the film 4, heated by the heater 6A is transmitted to the toner, and the toner is fixed onto the toner holding member with pressure by the roller 6C and the heat. The fixing film 4 of the present invention can be rotated without meandering by engaging the rib portion at the film end with the groove 8 of the heater holder 6B so that the rotation can be interlocked with the rotation of the roller 6C. Thus the fixing film 4 can be smoothly rotated and offset running of the toner holding member between the fixing film 4 and the roller 6C, a slip of the recording medium with respect to the fixing film 4 and the roller 6C, and the like, can be prevented. This improves image quality.

Figure 16:
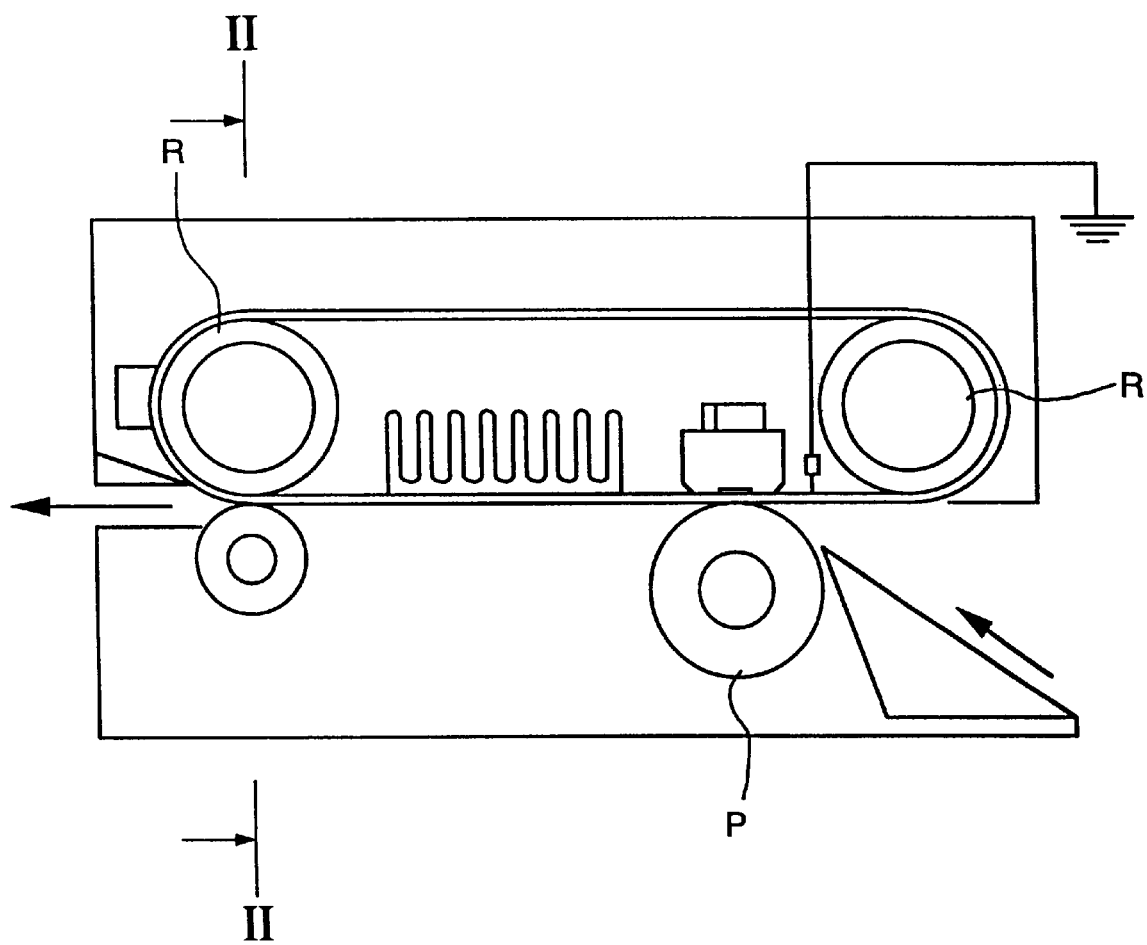
FIG. 16 is a schematic cross-sectional view showing another fixing unit using the fixing film.
Figure 17:
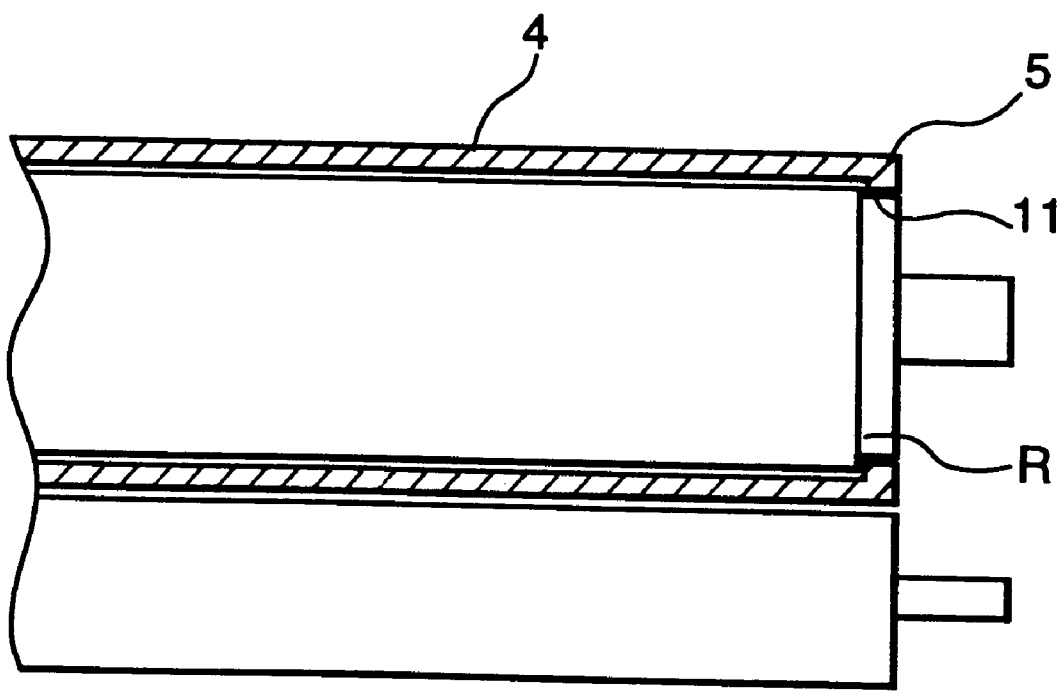
FIG. 17 is a cross-sectional view cut along a line B–B' in FIG. 13.

FIG. 16 shows an another example of the image forming apparatus using the tubular film of the present invention. In this example, a fixing unit of a copier is used. The detailed explanation of this fixing unit is described in Japanese Patent Application Laid-Open NO. 63-313182. In FIG. 16, the fixing film 4, which is deformed into a tubular shape having an ellipse cross section, is provided between drive rollers R and R. The fixing film 4 is rotated by the drive force of one roller R, and conveys a print sheet between the fixing film and a heat-pressing roller P, thus fixes the toner onto the print sheet. FIG. 17 shows a cross-sectional view cut along a line B–B' in FIG. 16. Note that the drive roller R has a 2.5 mm (width)×1.5 mm (depth) groove 11 on the circumferential surface so that the rib portion 5 is inserted into the groove 11. This prevents meandering of the film upon rotation, and obtains excellent image quality.

Next, materials applicable to the film of the present embodiment will be described. As thermoplastic resin materials, polyethylene, polypropylene, polymethylpenten, polystyrene, polyamide, polycarbonate, polysulfone, polyarylate, polyethylene terephthalate, polybutyrene terephthalate, polyphenylene sulfide, polyethersulfone, polyethernitryl, thermoplastic polyimide, polyetheretherketone, thermotropic liquid crystal polymer are preferable. The materials are appropriately selected in accordance with characteristics necessary for respective film portions.

Note that the materials of the films 4 and 5 are also appropriately selected from these materials. It is preferable that each film comprises a single material in consideration of joint strength at the overlapped portion. Further, it is possible to add organic or inorganic filler to the above resin materials for the purpose of increasing heat-resistance, adding conductivity, thermal-transmittance and the like, in accordance with necessity. For example, as organic filler, spherical/globular fine grain such as condensed polyimide can be employed; and as inorganic filler, carbon black, magnesium oxide, magnesium fluoride, silicon oxide, aluminum oxide, and titanium oxide, fibrous grain such as carbon fiber and glass fiber, potassium hexatitanate, potassium octatitanate, silicon carbide, silicon nitride, can be employed. It is preferable that both fillers are whisker filler.

As for mold materials, aluminum is proposed as the material of the cylindrical member, and stainless steel is proposed as the material of the tubular mold member. However, as well as these materials, resin material such as polytetrafluoroethylene, or combination of glass materials can be employed. FIG. 35 shows preferred combinations of materials of the respective members.

[Second Embodiment]

Figure 18:
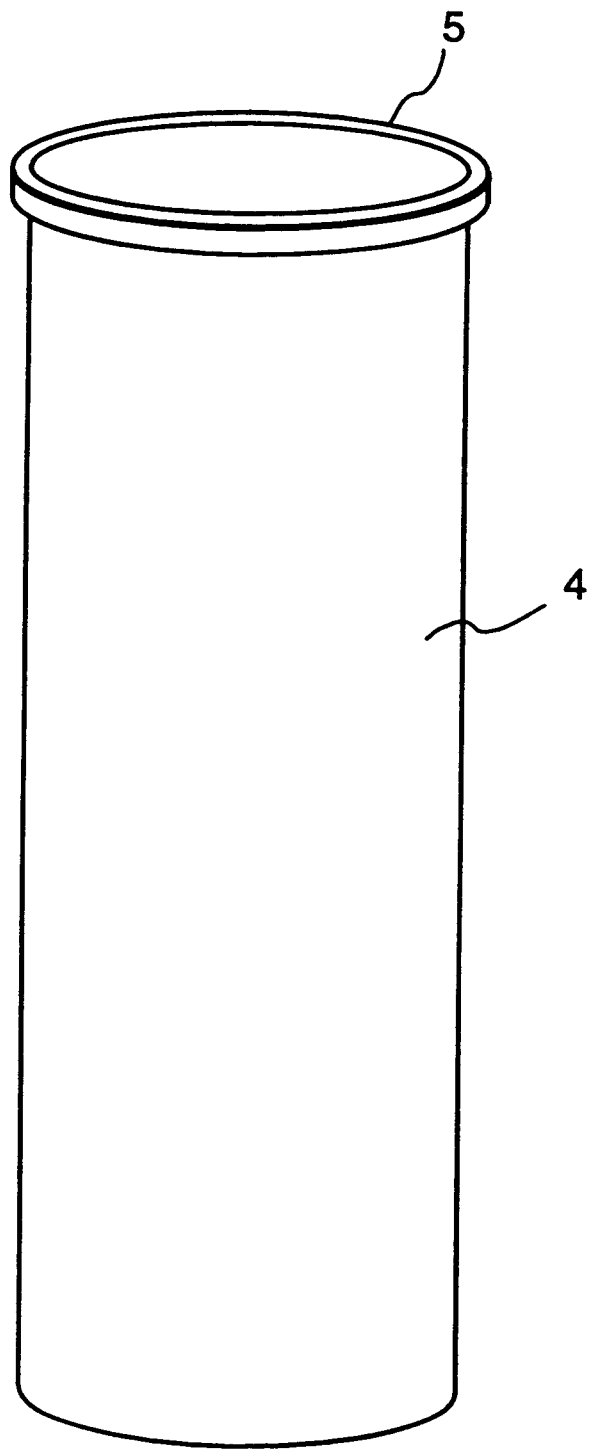
FIG. 18 is a perspective view showing a fixing film manufactured according to a second embodiment.

FIGS. 18 to 23 show a second embodiment of the present invention. As shown in FIG. 18, the feature of the second embodiment is that the engage (rib) portion 5 at one end portion of the tubular film 4, which is engaged with a drive roller of the fixing unit, is formed on the outer circumferential surface of the tubular film 4.

Hereinafter, the method for manufacturing the tubular film will be described. First, as the film sheet 4 (FIG. 21), a polyetheretherketone (malleated with two rollers) film sheet (length: 79 mm, width: 270 mm, thickness: 50 $\mu$m), and as a film sheet 5, a film sheet of the same material (length: 1520 mm, width: 2 mm, thickness: 50 $\mu$m), are employed, similar to the first embodiment.

Figure 19:
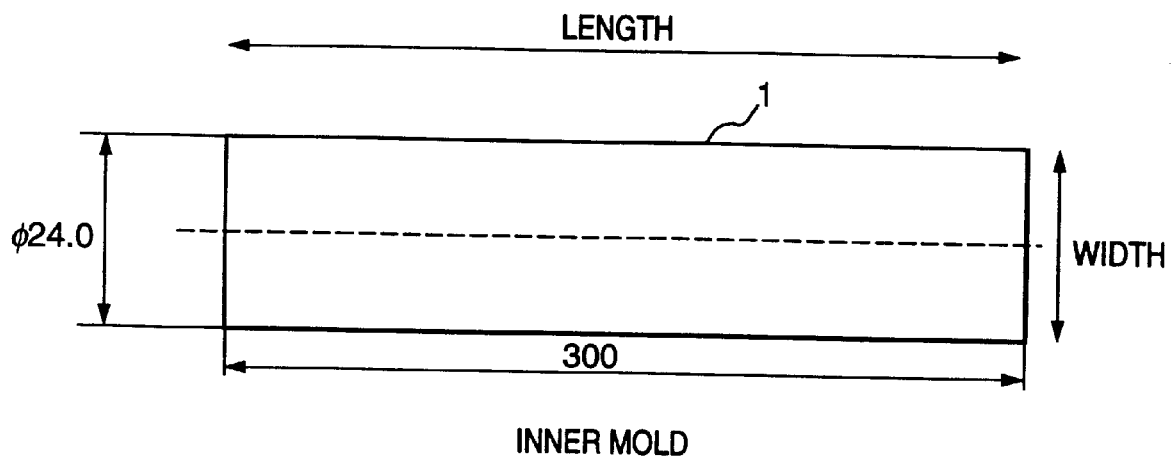
FIG. 19 is a diagram showing the measurements of the cylindrical member 1 as the inner mold, according to the second embodiment.
Figure 20:
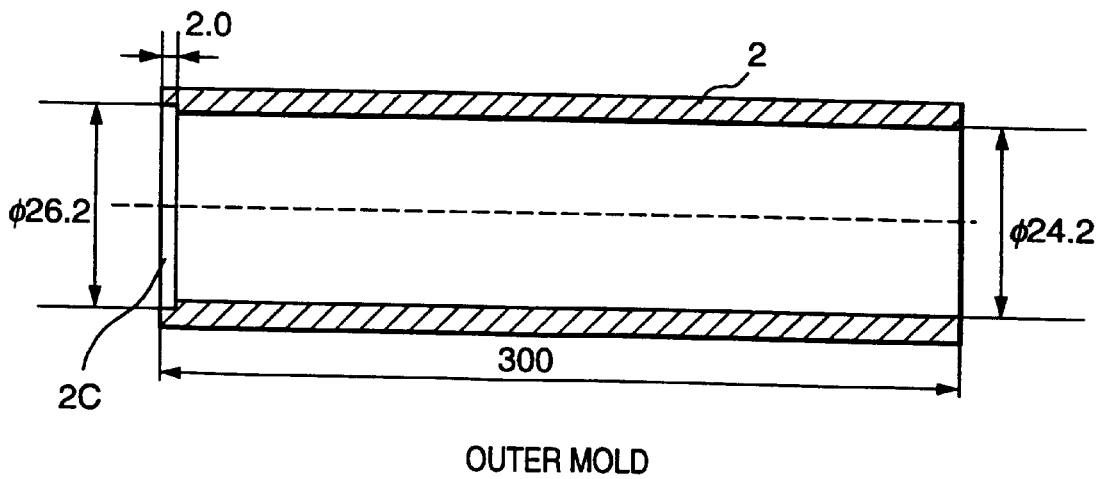
FIG. 20 is a diagram showing the measurements of the tubular member 2 as the outer mold, according to the second embodiment.

Also similar to the first embodiment, as the material of the cylindrical member 1, aluminum is selected, and as the material of the tubular mold member 2, stainless steel is selected. FIGS. 19 and 20 shows the measurements of the cylindrical member 1 and the tubular mold member 2. The diameter of the cylindrical member 1 is 24.0 mm; the length of the cylindrical member 1, 300.0 mm; the inner diameter of the tubular mold member 2, 24.2 mm; the outer diameter of the tubular mold member 2, 30.0 mm; and the length of the tubular mold member 2, 300.0 mm. Note that the tubular mold member 2 has a 2 mm (width)×1 mm (depth) groove portion 2C on the inner circumferential surface, at one end (See FIG. 20).

Figure 21:
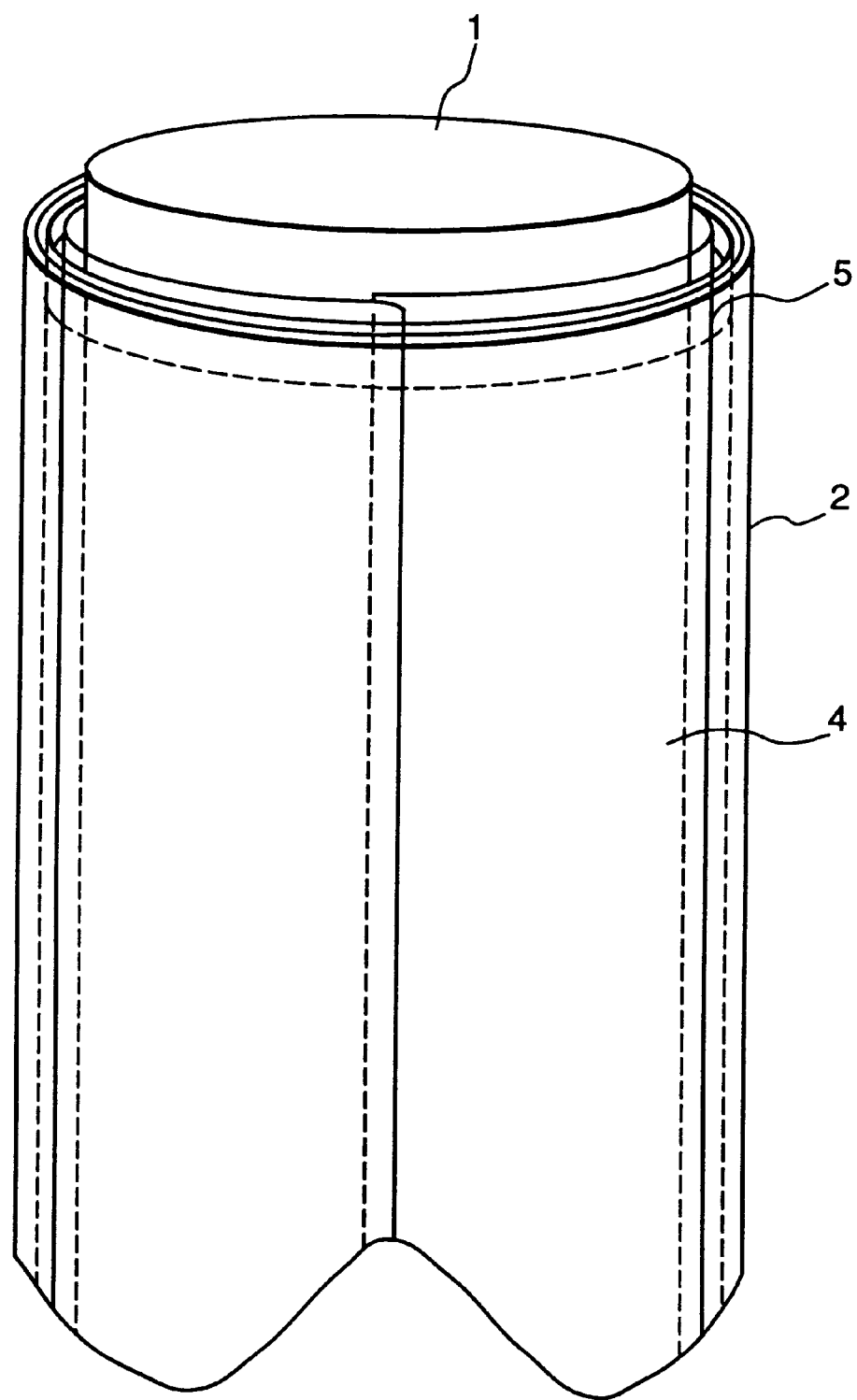
FIG. 21 is a perspective view showing the cylindrical member 1 around which films 4 and 5 are rolled and the tubular member 2 covering the cylindrical member 1, according to the second embodiment.

As shown in FIG. 21, the film sheet 4 is rolled one round, on the outer circumferential surface 1a of the cylindrical member 1, such that the both film ends overlap with each other. The width of the overlapped portion is about 4.0 mm.

Next, the film sheet 5 is rolled 20 rounds, within the groove portion 2C of the tubular mold member 2, such that its roll-head portion and roll-end portion overlap with each other. Further, the film sheet 4 rolled around the cylindrical member 1 is inserted into [the hollow part of] the tubular member 2 where the film sheet 5 is arranged (See FIG. 21).

Then, the cylindrical member 1, the film sheets 4, 5 and the tubular mold member 2 are placed in the heating furnace 60 and heated, similar to the first embodiment.

As for the heating conditions in the heating furnace 60, the heating temperature is 370±5° C.; and the heating period, 30±1 min.

By the heating, the measurements of the parts of the respective members change as follows. The diameter of the cylindrical member 1 as the inner mold expands from 24 mm to 24.199 mm; the inner diameter of the small-diameter portion of the tubular mold member 2 (tubular-mold main body), from 24.2 mm to 24.325; and the diameter of the greater-diameter portion (groove portion 2C) of the tubular mold member 2, from 26.2 mm to 26.336 mm.

Accordingly, the gaps between the respective parts of the inner mold 1 and those of the outer mold 2-are, small-diameter portion:
24.325−24.199=0.126 mm greater-diameter portion:
26.336−24.199=2.137 mm The thickness of the rolled film sheet 4 at the overlapped end portion is 50 μm×3=0.15 mm. The thickness of the rolled film 5 at the overlapped end portion is 2.2 mm.

The respective rolled film sheets receive pressing forces in accordance with the different sizes of gaps due to the different thermal-expansion coefficients of the mold members, and melt-joined with each other. Next, the after heated, the product is dipped into a cooling liquid within a liquid reservoir, and cooled at a cooling rate of 300° C./min.

Thereafter, the tubular film comprising the melt-joined film sheets 4 and. 5, at about a room temperature, is removed from the cylindrical member 1 and the tubular mold member 2. The tubular film has a cylindrical shape with a smooth overlapped end portion (4), and has a 2 mm (width)×1 mm (thickness) rib portion (5) at its one end.

Figure 22:
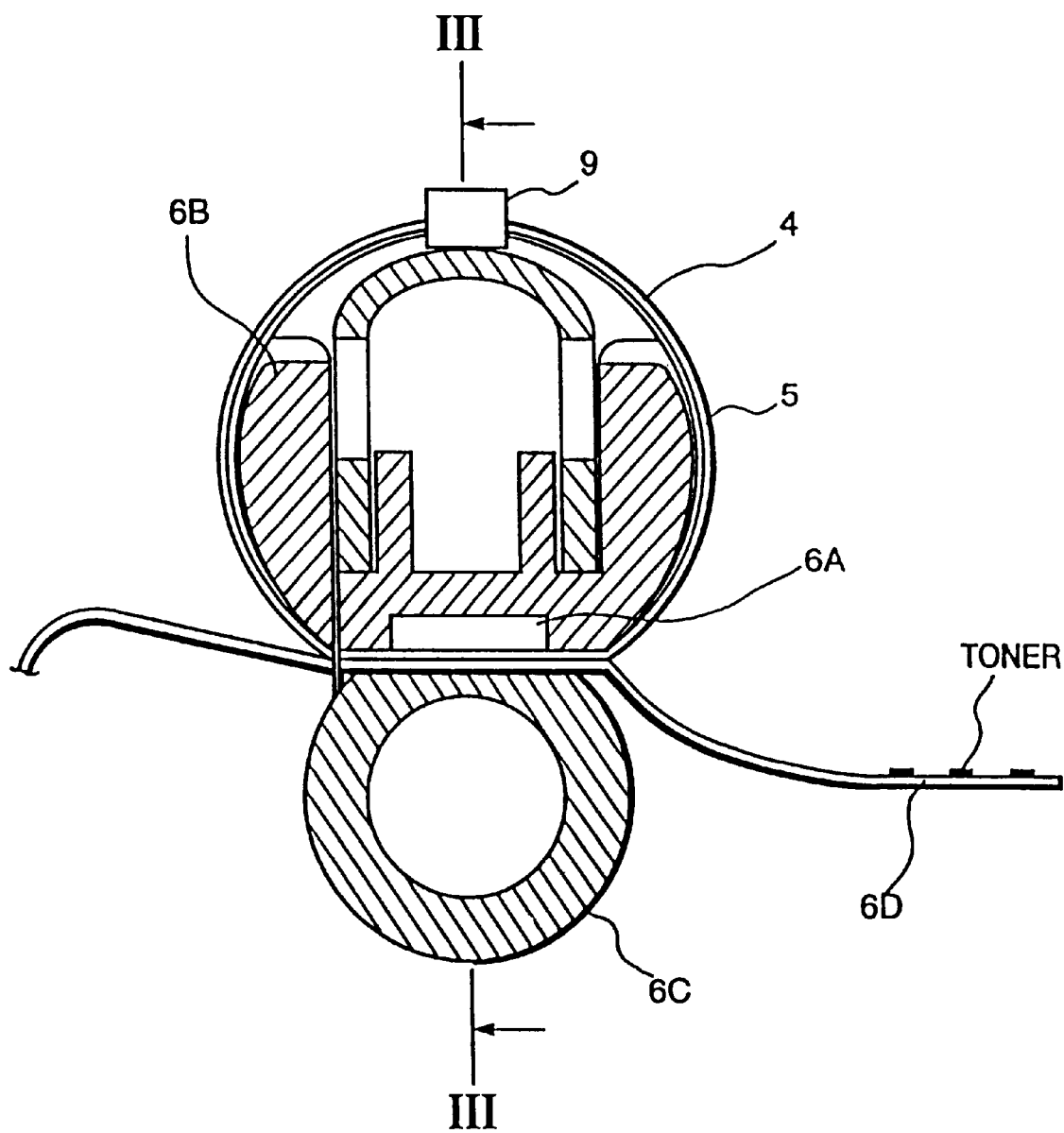
FIG. 22 is a cross-sectional view showing a fixing unit using the fixing film of the second embodiment.
Figure 23:
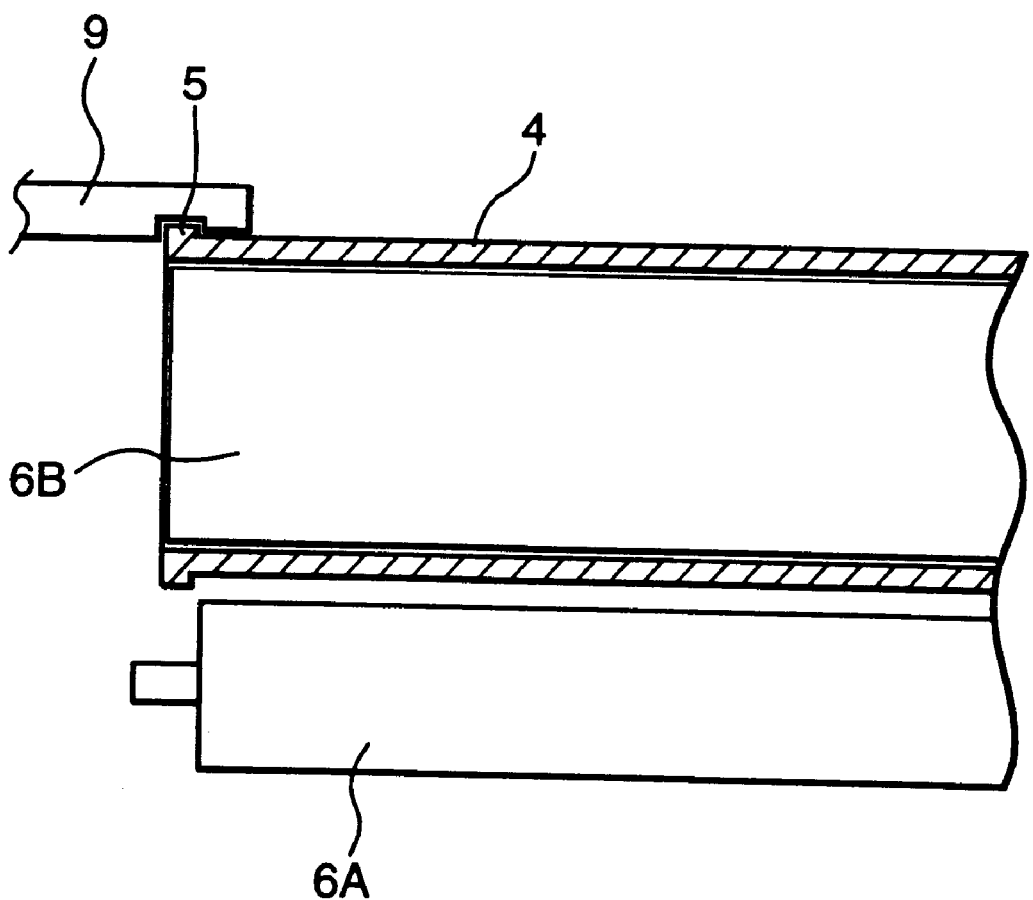
FIG. 23 is a cross-sectional view cut along a line C–C' in FIG. 22.

The tubular film 4 manufactured in the above method is used in a fixing unit of an image forming apparatus (LBP) as shown in FIGS. 22 and 23. FIG. 23 shows a cross-sectional view cut along a line C–C' in FIG. 22. In FIG. 22, numeral 4 denotes the tubular (fixing) film of the present invention; 6A, a heater for the fixing film 4; 6B, a heater holder; 9, a guide member arranged so as to guide the rib portion 5 of the film 4; and 6C, a pressing roller which is driven by drive means (not shown). The fixing film 4 of the present embodiment has the rib portion 5 at one end. The rib portion 5 functions as an engage portion guided by the guide member 9, which prevents meandering of the film, and obtains excellent image quality.

[Third Embodiment]

Figure 24:
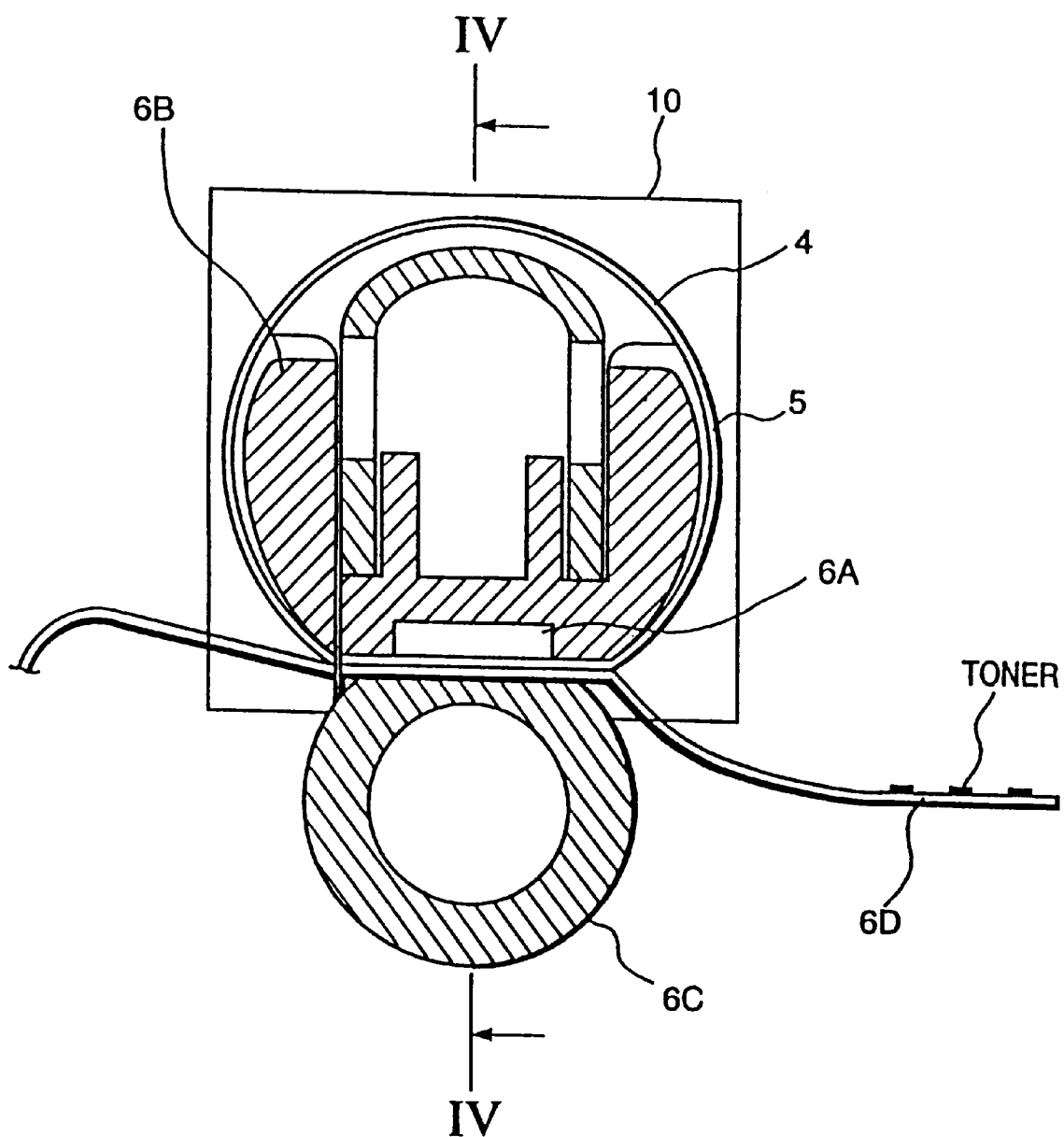
FIG. 24 is a cross-sectional view showing another fixing unit using the fixing film.
Figure 25:
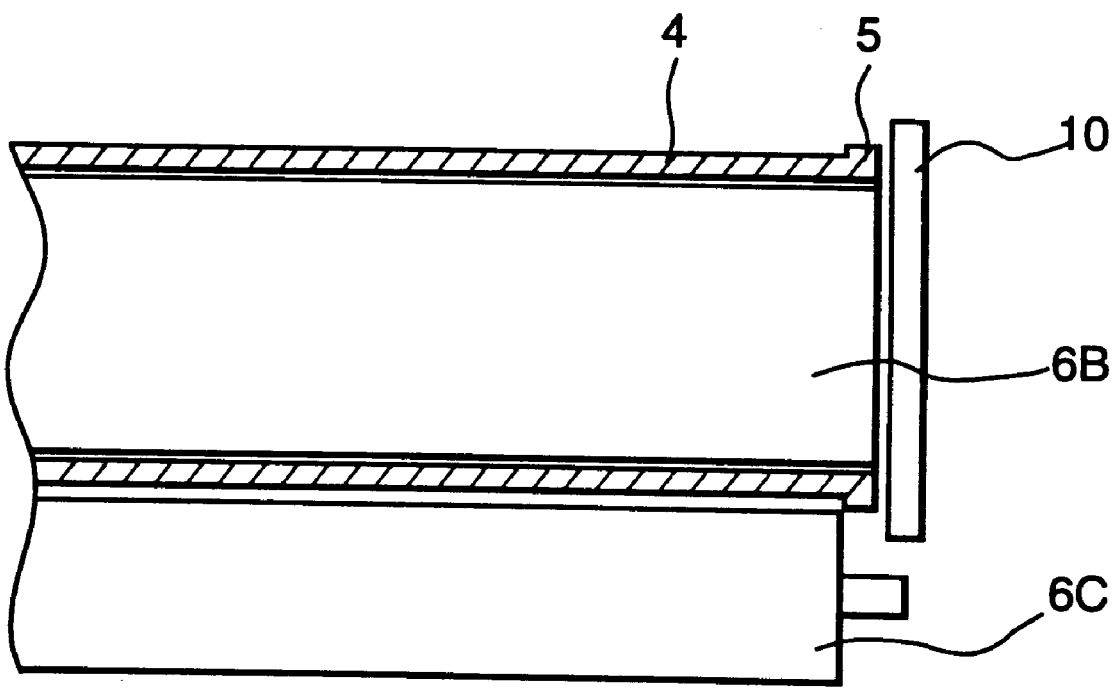
FIG. 25 is a cross-sectional view cut along a line D–D' in FIG. 24.

The tubular film 4 obtained in the second embodiment is used in a fixing unit of an image forming apparatus (LBP) as shown in FIG. 24. FIG. 25 shows a cross-sectional view cut along a line D–D' in FIG. 24. The construction in FIG. 24 is the same as that of the second embodiment except that the guide member 9 of the second embodiment is replaced with a thrust member 10 so as to change press-contact force of the pressing roller 6C to the film 4, and always forcibly offset the film 4 to the thrust member 10 side. The fixing film 4 of the present embodiment has the rib portion 5 at one end to prevent meandering of the film, and further reduce breakage of the film end portion. Driving the fixing unit having this fixing film 4 results in excellent image quality.

[Fourth Embodiment]

Figure 26:
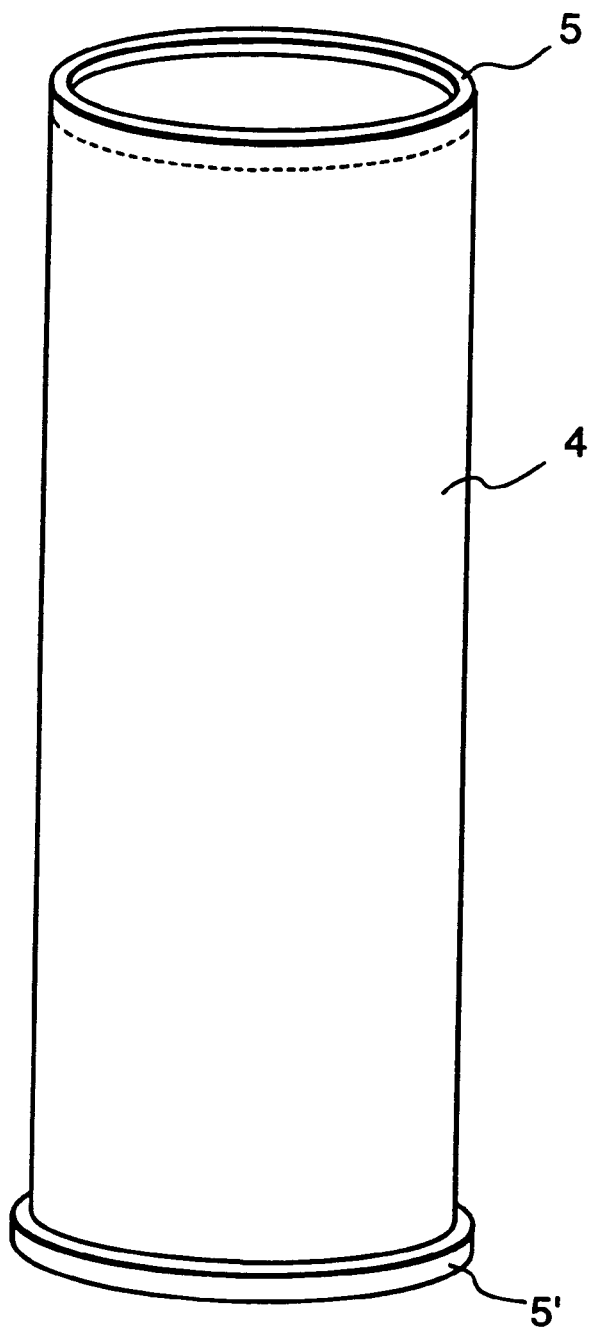
FIG. 26 is a perspective view showing the fixing film according to a fourth embodiment.

FIG. 26 shows a fourth embodiment of the present invention. The feature of the fourth embodiment resides in two rib portions 5 and 5' formed at both ends of the tubular film 4. In FIG. 26, the rib portion 5 is formed on the inner circumferential surface of the film 4, and the rib portion 5d, on the outer circumferential surface of the film 4.

Figure 27:
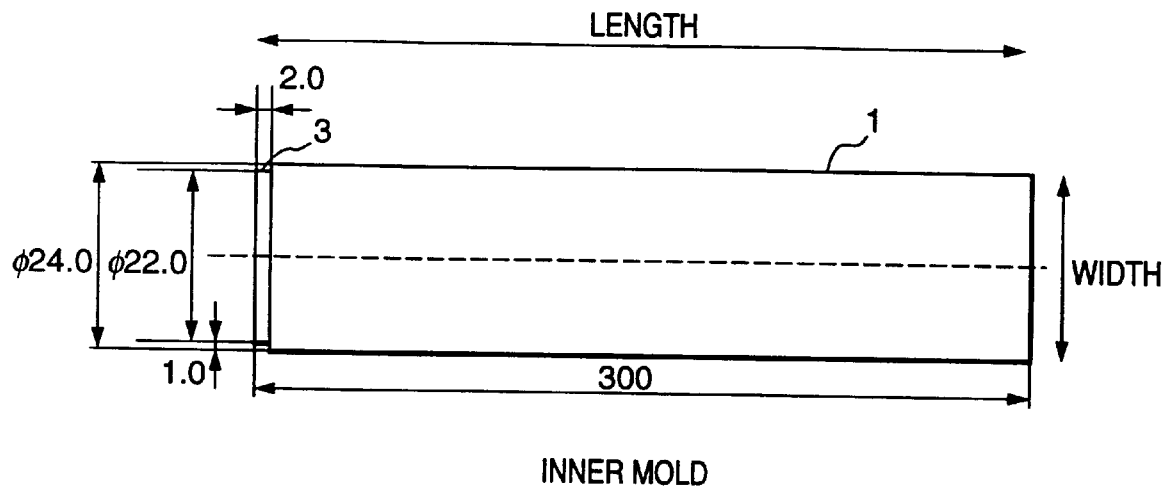
FIG. 27 is a diagram showing the measurements of the cylindrical member 1 according to the fourth embodiment.

Hereinafter, the method for manufacturing this tubular film will be described. First, as the film sheet 4, a polyetheretherketone (malleated with two rollers) film sheet (length: 79 mm, width: 270 mm, thickness: 50 μm), similar to that of the first embodiment, and as two film sheets 5, 5', film sheets of the same material (length: 1520 mm, width: 2 mm, thickness: 50 μm) are prepared. The material of the cylindrical member 1 is aluminum, and the material of the tubular mold member 2 is stainless steel. The diameter of the cylindrical member 1 is 24.0 mm; and the length of the cylindrical member 1, 300.0 mm. A 2 mm (width)×1 mm (depth) groove portion 3 (See FIG. 27) is formed at one end on the circumferential surface of the cylindrical member 1.

Figure 28:
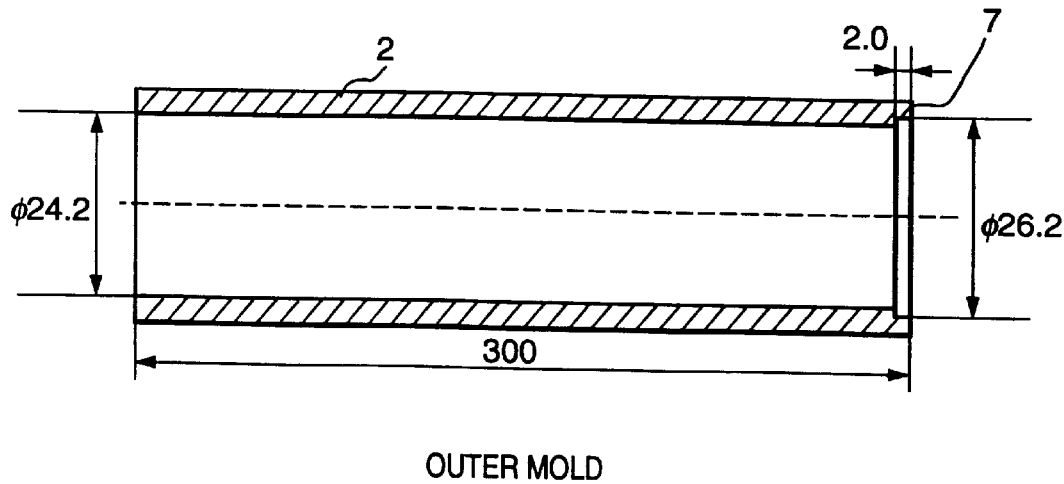
FIG. 28 is a diagram showing the measurement of the tubular member 2 according to the fourth embodiment.

The inner diameter of the tubular mold member 2 is 24.2 mm; the outer diameter of the tubular member 2, 30.0 mm; and the length of the tubular member 2, 300.0 mm. Note that a 2 mm (width)×1 mm (depth) groove portion 7 (See FIG. 28) is formed on the inner surface of the tubular mold member 2 at one end.

First, as shown in FIG. 13, the film sheet 5 is rolled 20 rounds at the groove portion 3 of the cylindrical member 1, and the film sheet 4 is rolled around the cylindrical member 1 such that the film sheet 4 overlaps with the film sheet 5, as shown in FIG. 14. The width of the overlapped end portion of the film 4 is about 4.0 mm.

Figure 29:
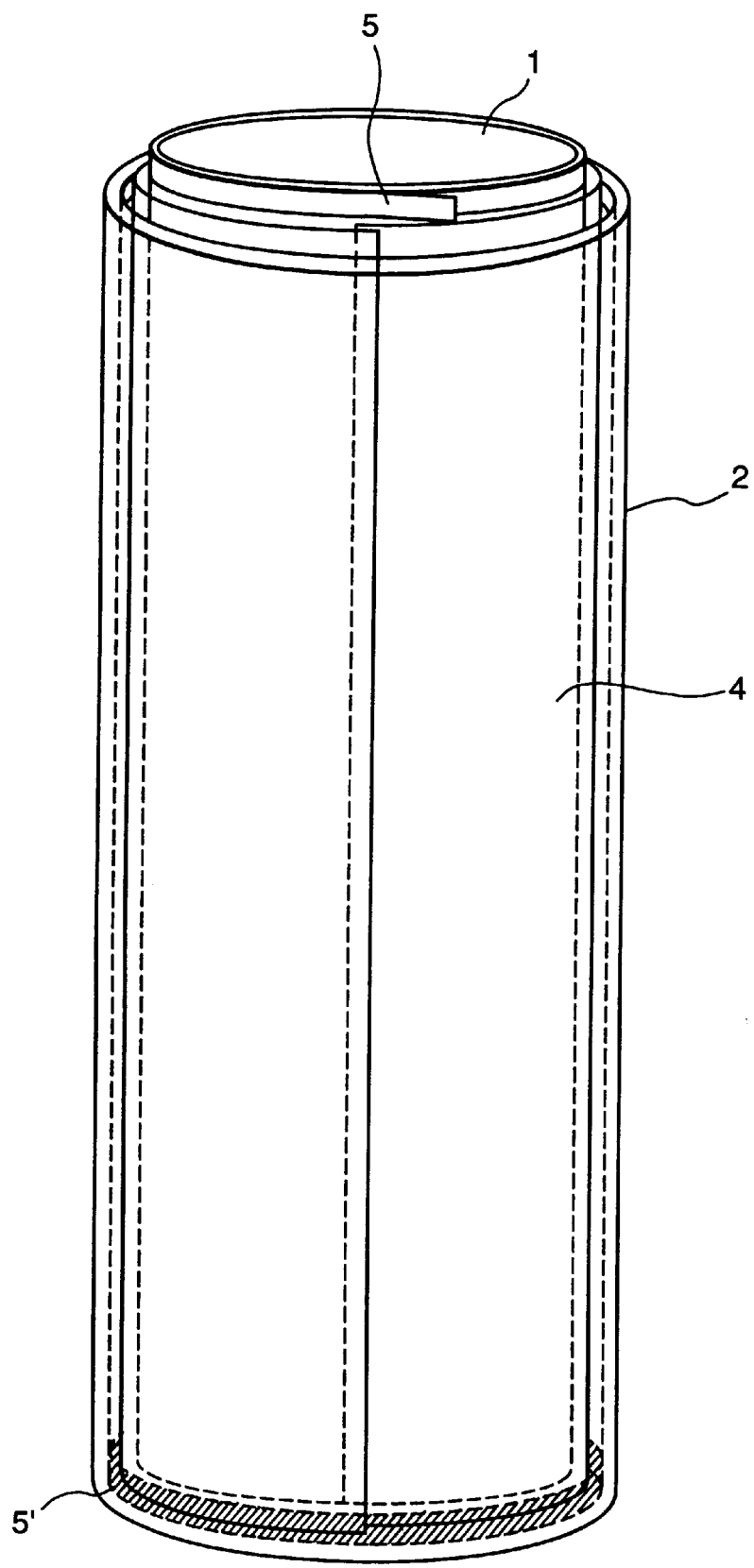
FIG. 29 a perspective view showing another example of manufacturing the fixing film of the fourth embodiment.

Next, the film sheet 5' is rolled 20 rounds within the groove portion 7 of the tubular mold member 2. Then, the cylindrical member 1 around which the film sheets 4 and 5 are rolled is inserted into the hollow part of the tubular mold member 2 where the film 5' is rolled within the groove portion 7, as shown in FIG. 29.

The cylindrical member 1, the rolled film sheets 4, 5, 5', and the tubular mold member 2 are placed in the heating furnace 60 as shown in FIG. 7, and heated there, similar to the first embodiment.

As the heating conditions in the heating furnace 60, the heating temperature is 370±5° C., and the heating period, 30±1 min. After the heating, the product is dipped into a cooling liquid in a liquid reservoir and cooled at a rate of 300° C. /min. Then, the tubular film comprising the joined film sheets 4, 5, and 5' is removed from the cylindrical member 1 and the tubular mold member 2 at about a room temperature. The tubular film has a tubular (cylindrical) shape with a smooth overlapped portion (4), and has a 2 mm (width)×1 mm (thickness) rib portion 5 on the inner circumferential surface at one end, and a 2 mm (width)×1 mm (thickness) rib portion 5', on the outer circumferential surface at the other end.

Figure 30:
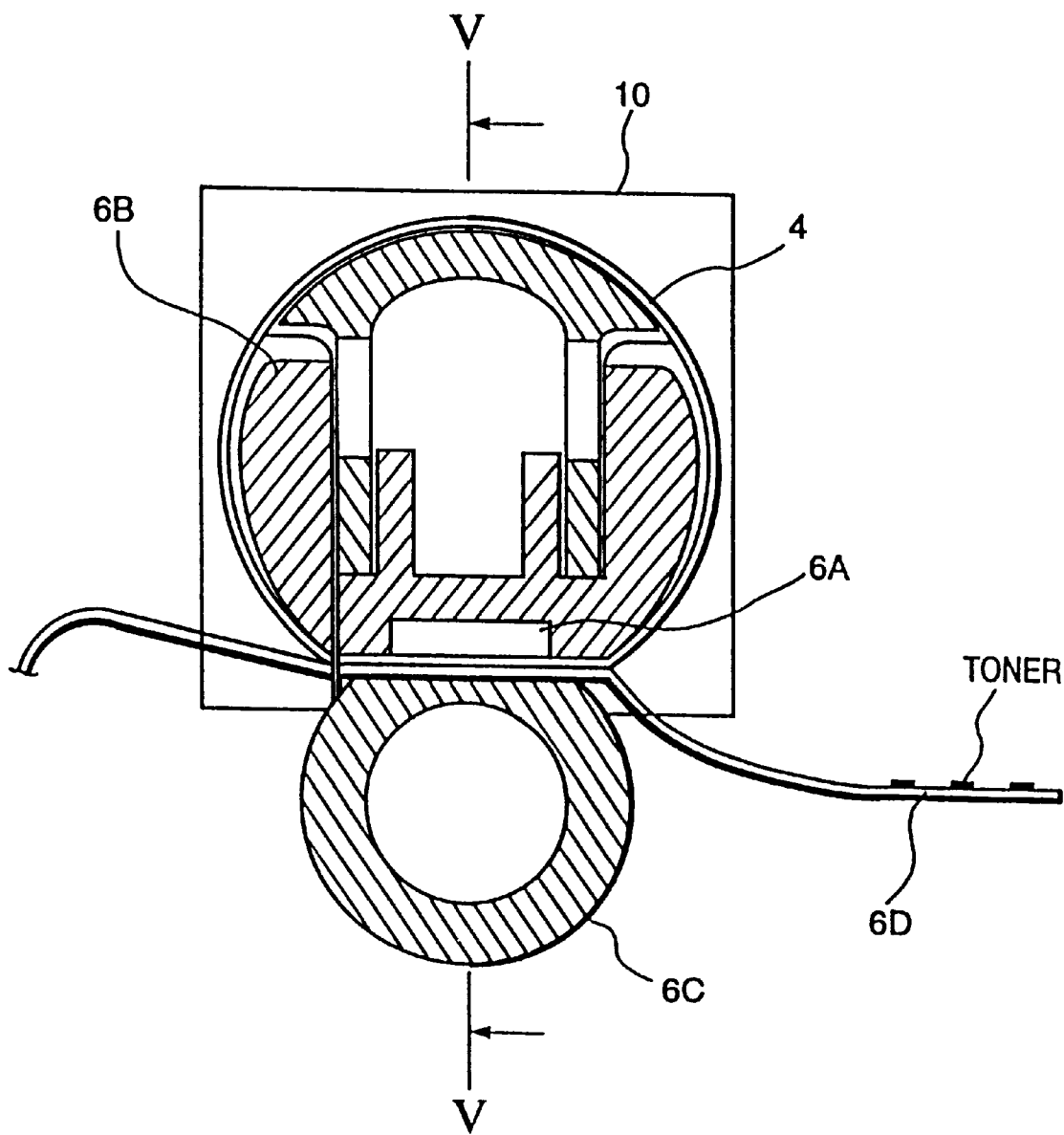
FIG. 30 is a cross-sectional view showing a fixing unit using the fixing film of the fourth embodiment.
Figure 31:
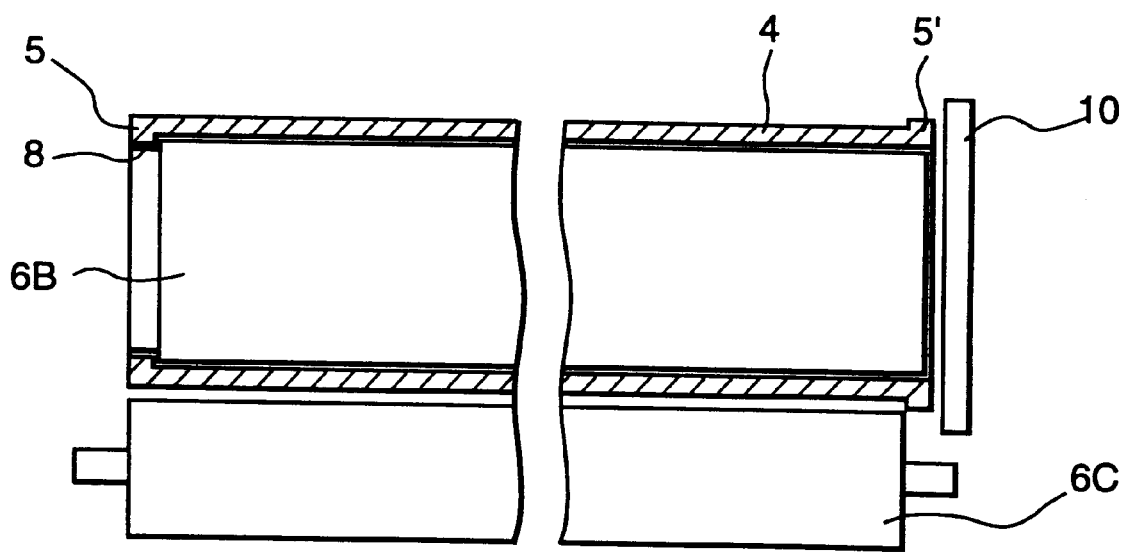
FIG. 31 is a cross-sectional view cut along a line E–E' in FIG. 30.

This tubular (fixing) film 4 manufactured in the above method is used in a fixing unit of an image forming apparatus (LBP) as shown in FIG. 30. FIG. 31 shows a cross-sectional view cut along a line E–E' in FIG. 30.

In FIG. 30, numeral 4 denotes the tubular (fixing) film of the present invention; 6A, a heater for the fixing film 4; and 6B, a heater holder.

The heater holder 6B has a 2.5 mm (width)×1.5 mm (depth) groove 8 on the outer circumferential surface at a portion to be in contact with the rib portion 5 of the fixing film 4. The fixing film 4 is arranged such that the rib portion 5 is inserted into the groove 8. Further, a guide member 9 is provided at a position to guide the rib portion 5'. Numeral 6C denotes a pressing roller which is driven by drive means (not shown).

According to the present embodiment, the fixing film 4 has rib portions 5 and 5' at both ends, and by guiding these rib portions 5 and 5' with the groove 8 formed on the heater holder 6B and the guide member 9, meandering of the film can be prevented, and excellent image quality can be obtained.

[Fifth Embodiment]

Figure 32:
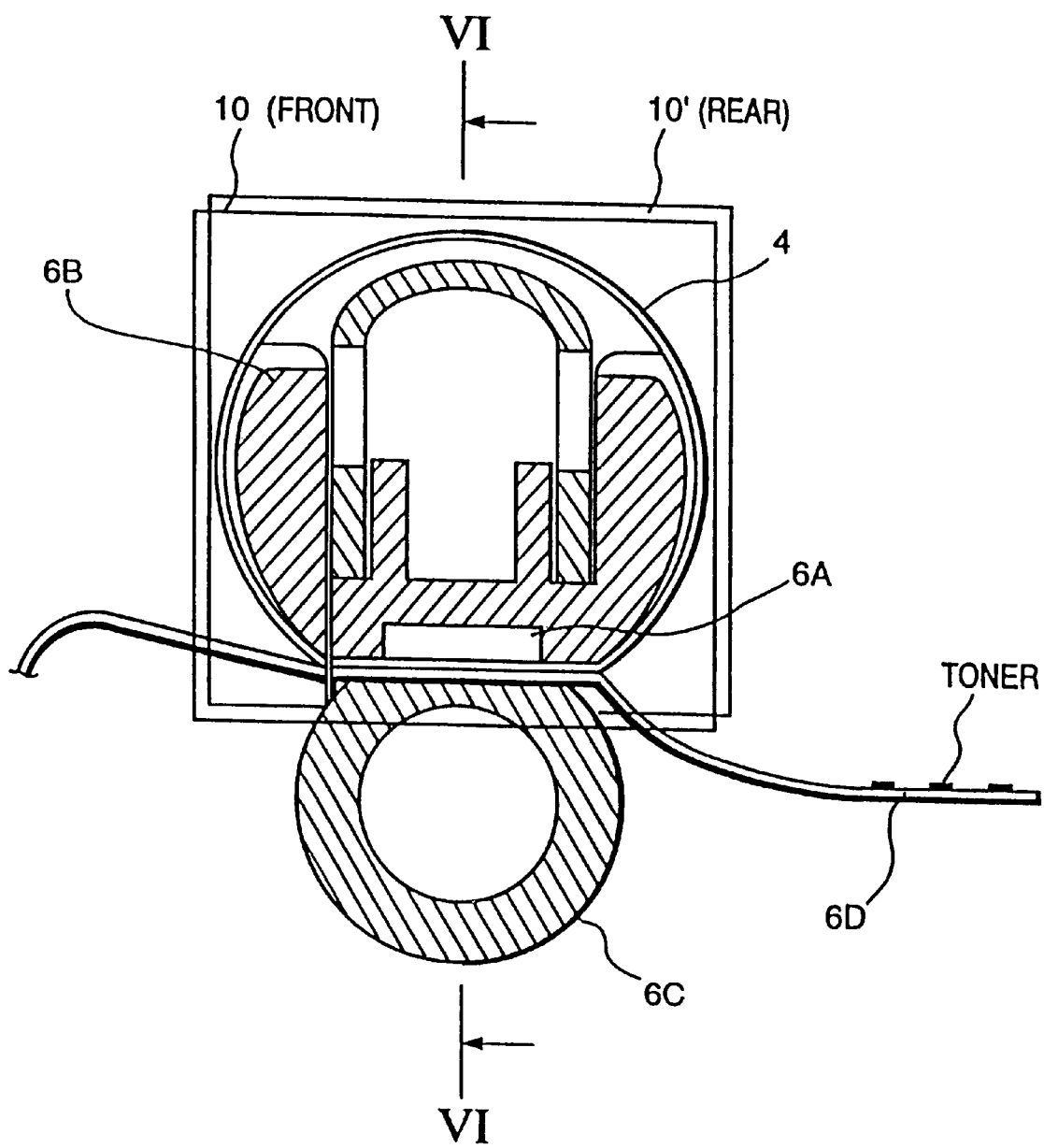
FIG. 32 is a cross-sectional view showing a fixing unit using the fixing film according to a fifth embodiment.
Figure 33:
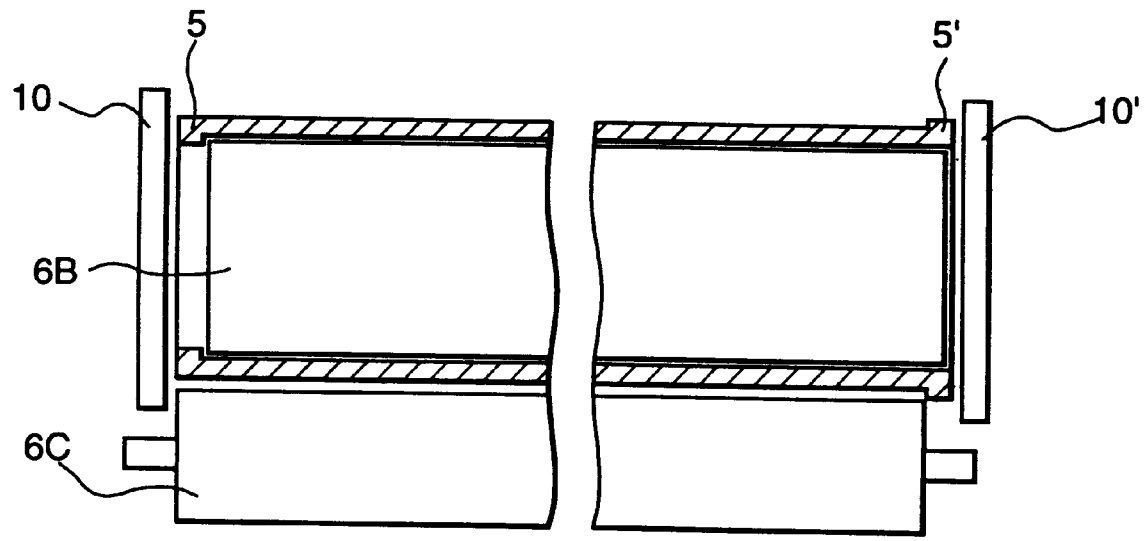
FIG. 33 is a cross-sectional view cut along a line F–F' in FIG. 32.

The tubular film 4 obtained in the fourth embodiment is used in a fixing unit of an image forming apparatus (LBP) as shown in FIG. 32. FIG. 33 shows a cross-sectional view cut along a line F–F' in FIG. 32.

The construction in FIG. 33 is the same as that of the fourth embodiment except that the guide member 9 and the groove 8 formed on the heater holder 6B are replaced with thrust members 10 and 10'. The fixing film 4 of the present embodiment has two rib portions 5 and 5' at both ends. The fixing film 4 is rotated while thrusting the rib portions 5 and 5' against the thrust members 10 and 10', which reduces meandering of the film to the minimum, and prevents breakage of the film. This obtains excellent image quality.

[Sixth Embodiment]

Figure 34:
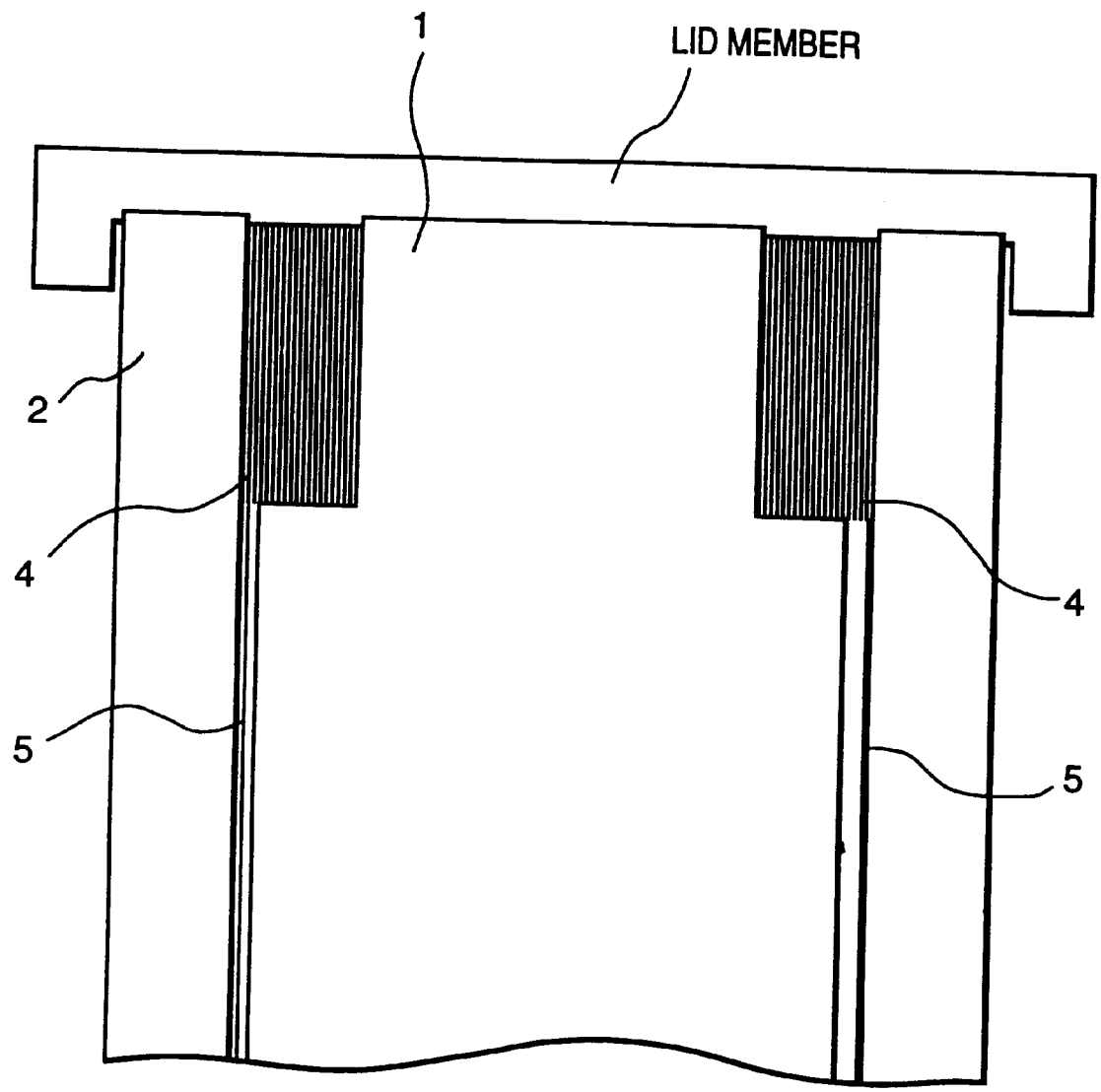
FIG. 34 is a cross-sectional view showing an example using a lid member, according to a sixth embodiment.

FIG. 34 shows a sixth embodiment as a modification to the first to fifth embodiments as shown in FIGS. 1 to 33. The above embodiments form the tubular film by rolling the film sheets 4 and 5 in the gap between the cylindrical member and the tubular mold member, and heating them to cause melt-joining. Both ends of the tubular mold member are open.

Accordingly, in the heating process, the shape of the end portion of the tubular film may not be precisely formed. As shown in FIG. 34, the present embodiment provides a lid member to cover the end of the tubular mold member and the end of the cylindrical member, so that the end portion of the formed tubular film can be precisely formed with designed measurement.

As described above, according to the present invention, a tubular film is manufactured by a method of rolling a thermoplastic film sheet around a cylindrical member such that both ends overlap with each other, inserting the cylindrical member around which the film sheet is rolled into a tubular mold member with a thermal-expansion coefficient different from that of the cylindrical member, the tubular member having a groove portion at least one end portion where another thermoplastic film sheet is rolled, and then heating the members such that the overlapped film end portions and rolled film sheets are melt-joined with each other into a tubular shape with a rib portion. The obtained tubular film can be preferably used as a fixing film of a fixing unit of an image forming apparatus, or films for many other purposes.

The tubular film of the present invention enables to transmit heat from a heater onto toner and recording medium such as a print sheet with high efficiency, to prevent offset running of the recording medium upon conveying the recording medium for fixing the toner by pressing force onto the recording medium, to perform smooth rotation of the fixing film by a drive roller without rotation unevenness or shift. This attains great improvement of fixing precision upon fixing toner onto a recording medium.

Further, according to the present invention, the base portion of the fixing film, and the rib portion, as an engage portion to be engaged with the drive roller for rotating the fixing film are simultaneously and integrally formed. This reduces manufacturing costs.

That is, according to the tubular-film manufacturing method of the present invention, as the base film portion and the engage portion can be simultaneously formed, the engage portion can be formed with precise measurements, and the obtained fixing film engages with a drive roller smoothly.

Further, in the fixing film of the present invention, the engage portion can be designed with arbitrary measurements.

Further, as shown in the sixth embodiment, as the shape of the engage portion to be engaged with a drive roller can be formed with high precision, the fixing film engages with the drive roller smoothly, and smooth fixing-rotation of the fixing film can be improved.

The present invention is not limited to the above embodiments and various changes and modifications can be made within the spirit and scope of the present invention. Therefore, to appraise the public of the scope of the present invention, the following claims are made.

What is claimed is:

1. A tubular film manufactured by:
   rolling a first thermoplastic film sheet into a tubular shape, such that a part of a roll-head and a part of a roll-end overlap with each other;
   rolling a second thermoplastic film sheet, having a width narrower than that of the first thermoplastic film sheet, on the inner circumferential surface or the outer circumferential surface of the tubular-shaped first film sheet, on at least one end of the tubular-shaped first film sheet, at least one round; and
   heat-melt-joining the first and second film sheets, so that the tubular film has a rib portion thicker than the other portion.

2. The tubular film according to claim 1, wherein the first and second film sheets comprise the same material.

3. A tubular film manufactured by:
   rolling a thermoplastic film sheet having a thickness t around a cylindrical member n rounds;
   inserting the cylindrical member into a tubular mold member;
   heating the cylindrical member and the tubular mold member within a melt-joining temperature range of the film, so as to obtain a gap between the cylindrical member and the tubular mold member as $(2n+1) \times t > x' \geq 2nt$, with x' being the difference between an outer diameter of the cylindrical member and an inner diameter of the tubular mold member; and
   melt-joining both ends of the film sheet.

4. A film for a fixing unit of an image forming apparatus, manufactured by:
   rolling a thermoplastic film sheet into a tubular shape, such that a part of a roll-head and a part of a roll-end overlap with each other;
   rolling another thermoplastic film sheet as a rib portion, at least at one portion of the inner circumferential surface or the outer circumferential surface of the tubular-shaped film sheet, such that the rib portion is thicker than the other portion of the tubular-shaped film sheet;

placing the tubular-shaped film sheet in a heated condition for a predetermined period so as to heat-melt-join the overlapped roll-head and roll-end, and the tubular-shaped film sheet and the rib portion, wherein the tubular film presses toner on an image holding member between a pressing member and the tubular film and fixes the toner onto the image holding member.

5. An image forming apparatus using the tubular film in claim 4.

6. A conveyance belt for an image forming apparatus manufactured by:

rolling a thermoplastic film sheet into a tubular shape, such that a part of a roll-head and a part of a roll-end overlap with each other;

rolling another thermoplastic film sheet, as a rib portion, at least at one portion of the inner circumferential surface or the outer circumferential surface of the tubular-shaped film sheet so that the rib portion is thicker than the other portion of the tubular-shaped film sheet; and placing the tubular-shaped film sheet in a heated condition for a predetermined period and heat-melt-joining the overlapped roll-head and roll-end, and the tubular-shaped film sheet and rib portion.

* * * * *

UNITED STATES PATENT AND TRADEMARK OFFICE
CERTIFICATE OF CORRECTION

PATENT NO. : 6,101,362
DATED : August 8, 2000
INVENTOR(S): SHOICHI SHIMURA, ET AL.

It is certified that error appears in the above-identified patent and that said Letters Patent is hereby corrected as shown below:

[56] REFERENCES CITED:

FOREIGN PATENT DOCUMENTS, "63-374121" should read
--63-34121--.

[57] ABSTRACT:

Line 2, "apparatus. Includes" should read
--apparatus includes--.

COLUMN 9:

Line 31, "2-are," should read --2 are,--.

Signed and Sealed this

Twenty-ninth Day of May, 2001

Attest:

NICHOLAS P. GODICI

*Attesting Officer*    *Acting Director of the United States Patent and Trademark Office*